US011203311B2

(12) United States Patent
Fujino

(10) Patent No.: US 11,203,311 B2
(45) Date of Patent: Dec. 21, 2021

(54) STEERING DEVICE FOR VESSELS AND VESSEL

(71) Applicant: YAMAHA HATSUDOKI KABUSHIKI KAISHA, Iwata (JP)

(72) Inventor: Kenichi Fujino, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 87 days.

(21) Appl. No.: 16/594,164

(22) Filed: Oct. 7, 2019

(65) Prior Publication Data
US 2020/0247519 A1 Aug. 6, 2020

(30) Foreign Application Priority Data
Feb. 6, 2019 (JP) .............................. JP2019-019517

(51) Int. Cl.
*B60R 16/027* (2006.01)
*B63H 25/02* (2006.01)
*H02G 11/00* (2006.01)
*H01R 35/02* (2006.01)

(52) U.S. Cl.
CPC .......... *B60R 16/027* (2013.01); *B63H 25/02* (2013.01); *H01R 35/02* (2013.01); *H02G 11/00* (2013.01); *B63H 2025/022* (2013.01)

(58) Field of Classification Search
CPC ....... B60R 16/023; B60R 16/027; B62D 1/04; B62D 1/043; B62D 1/046; B63H 25/02; B63H 2025/022; H01B 7/06; H01R 35/00; H01R 35/02; H01R 35/025; H01R 35/04; H02G 11/00
See application file for complete search history.

(56) References Cited

U.S. PATENT DOCUMENTS

| | | | | |
|---|---|---|---|---|
| 4,721,469 A | * | 1/1988 | Carlson ................ | H01R 35/025 439/13 |
| 4,978,191 A | * | 12/1990 | Hasegawa ............. | B60R 16/027 188/2 R |
| 5,046,951 A | * | 9/1991 | Suzuki .................... | B62D 1/10 439/15 |
| 5,106,316 A | * | 4/1992 | Bannai ................. | H01R 35/025 439/15 |
| 5,310,356 A | * | 5/1994 | Obata ................... | B60R 16/027 439/169 |
| 6,506,066 B2 | * | 1/2003 | Kuki ..................... | B60R 16/027 439/164 |

(Continued)

FOREIGN PATENT DOCUMENTS

JP    09-148028 A    6/1997

*Primary Examiner* — Ajay Vasudeva
(74) *Attorney, Agent, or Firm* — Keating and Bennett, LLP

(57) ABSTRACT

A steering device includes a sensor and a rotor, each of which rotates together with a steering wheel around a rotational axis, and a stator whose position in a circumferential direction is stationary. The steering device includes a harness that connects a target component and the sensor together, a first fastener that fixes the harness to the rotor, and a second fastener that fixes the harness to the stator. An intermediate portion between the first fastener and the second fastener in the harness includes a first extension and a second extension each of which extends along the circumferential direction and a connector that connects the first extension and the second extension together.

29 Claims, 9 Drawing Sheets

(56) References Cited

U.S. PATENT DOCUMENTS

| | | | | |
|---|---|---|---|---|
| 8,177,567 B2* | 5/2012 | Schroer | ............... | H01R 35/025 |
| | | | | 439/164 |
| 8,714,296 B2* | 5/2014 | Sano | ................. | H03K 17/9625 |
| | | | | 180/336 |

* cited by examiner

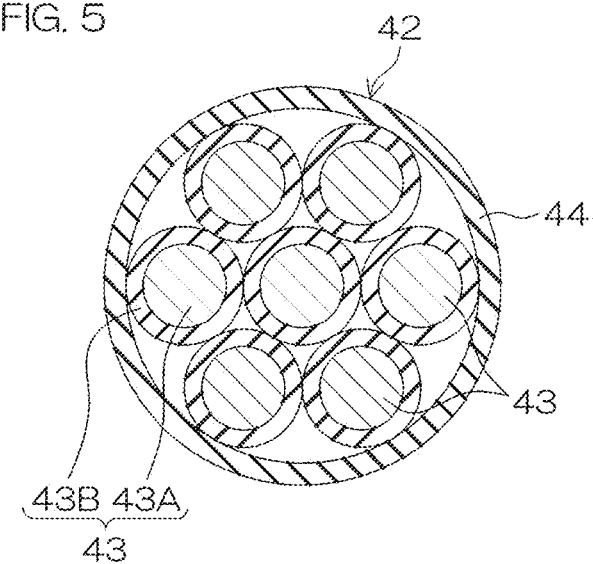
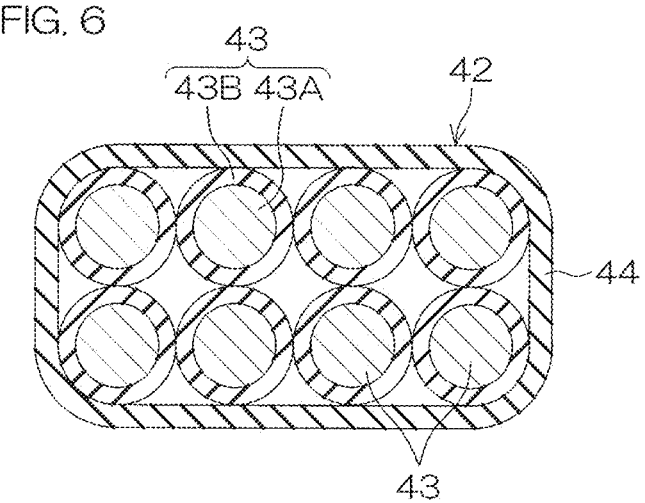

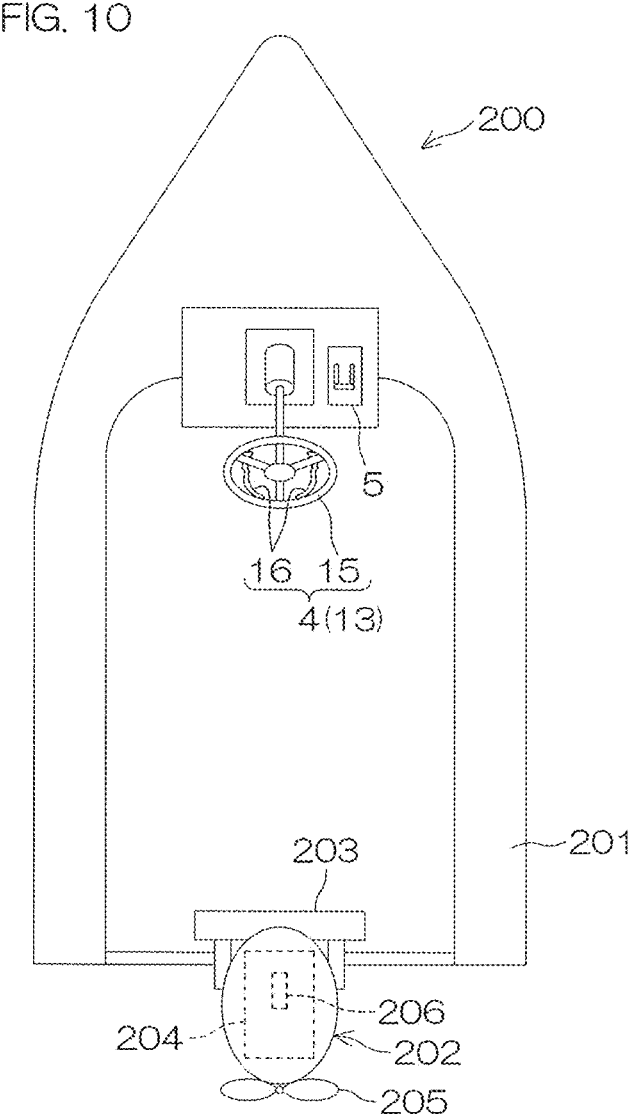

STEERING DEVICE FOR VESSELS AND VESSEL

CROSS REFERENCE TO RELATED APPLICATIONS

This application claims the benefit of priority to Japanese Patent Application No. 2019-019517 filed on Feb. 6, 2019. The entire contents of this application are hereby incorporated herein by reference.

BACKGROUND OF THE INVENTION

1. Field of the Invention

The present invention relates to a steering device for vessels and a vessel including the steering device.

2. Description of the Related Art

Japanese Patent Application Publication No. 9-148028 discloses a vehicle that includes a power source, such as a battery, a handle portion provided with a power consumption portion, such as an air bag or a horn switch, and a cable by which the power source and the power consumption portion are connected together. The power source is disposed on a vehicle body side. The handle portion is connected to a main shaft through a steering boss fixed to the main shaft connected to a steering mechanism on the vehicle body side. The handle portion includes a boss plate fixed to the steering boss, and a steering wheel connected to the boss plate by a spoke portion. The main shaft is covered with a columnar tube, and a combination switch box is fixed to the columnar tube. A cable guide made of a spiral tube is fixed to the combination switch box.

The cable includes a helical portion housed in the cable guide, a first linear portion continuous with one end of the helical portion, and a second linear portion continuous with the other end of the helical portion. The first linear portion is taken out from an outer-diameter-side opening portion of the cable guide, and extends to the power source. The second linear portion is taken out from an inner-diameter-side opening portion of the cable guide, and passes through a through-hole of the boss plate, and is connected to a connector of the power consumption portion.

When an operator rotates the steering wheel from a neutral position, the helical portion elastically extends, and the second linear portion is wound around a circumferential surface of the steering boss. In this state, when the operator returns the steering wheel to the neutral position, the helical portion elastically shrinks, and the second linear portion is rewound from the circumferential surface of the steering boss.

In the arrangement disclosed in Japanese Patent Application Publication No. 9-148028, the helical portion that stretches or shrinks in the cable is bulky because of its helical shape, and is disposed in a spiral manner, and therefore a wide housing space is required to be secured for the helical portion. Thus, the cable guide housing the helical portion becomes large, and therefore there is a concern that an appearance around the steering wheel will be degraded because of the presence of the cable guide. Additionally, there is a concern that the helical portion will be caught on the cable guide in the outer-diameter-side opening portion, the inner-diameter-side opening portion, etc., when the helical portion stretches or shrinks. If a plurality of cables are used, there is a concern that the cable guide will become even larger in size, or cables will be caught on each other in their helical portions.

Additionally, in the vehicular steering device disclosed in Japanese Patent Application Publication No. 9-148028, waterproof measures, etc., will be needed if such a vehicular steering device is applied to a vessel that is used in an environment differing from the environment of the vehicle disclosed therein, particularly in an environment in which it is easily wetted with water.

SUMMARY OF THE INVENTION

In order to overcome the previously unrecognized and unsolved challenges described above, preferred embodiments of the present invention provide steering devices for vessels that each include a steering wheel, an electrical component, a rotor, a stator, a harness, a first fastener, and a second fastener. The steering wheel is rotatable around a rotational axis. The electrical component rotates together with the steering wheel around the rotational axis. The rotor rotates together with the steering wheel around the rotational axis. The position of the stator in a circumferential direction around the rotational axis is stationary. The harness connects a target component, whose position in the circumferential direction is stationary, and the electrical component together. The first fastener fixes the harness to the rotor. The second fastener fixes the harness to the stator. An intermediate portion between the first fastener and the second fastener in the harness includes a first extension and a second extension, each of which extends in the circumferential direction, and a connector. The connector connects the first extension and the second extension together and curves from extending in a first circumferential direction of the circumferential direction to extending in a second circumferential direction of the circumferential direction opposite to the first circumferential direction. One of the first extension and the second extension is lengthened while the other one of the first extension and the second extension is shortened in accordance with rotation of the steering wheel.

According to this structural arrangement, the harness connects the electrical component that rotates together with the steering wheel around the rotational axis and the target component whose position in the circumferential direction around the rotational axis is stationary. The harness is fixed to the rotor that rotates together with the steering wheel by the first fastener, and is fixed to the stator whose position in the circumferential direction is stationary by the second fastener.

In the harness, the shape of the intermediate portion between the first fastener and the second fastener changes in accordance with the relative movement in the circumferential direction of the rotor with respect to the stator because the harness follows the rotation of the steering wheel when a vessel operator rotates the steering wheel in the circumferential direction. More specifically, the shape of the intermediate portion changes so that one of the first extension and the second extension, each of which extends along the circumferential direction, in the intermediate portion is lengthened and so that the other one of the first extension and the second extension is shortened. In this case, it is possible to enable the harness to follow the rotation of the steering wheel by changing the ratio occupied by each of the first and second extensions in the intermediate portion without stretching or shrinking the intermediate portion by using the helical portion described in Japanese Patent Application Publication No. 9-148028. Therefore, there is no need to dispose a helical portion, which is bulky and which is easily caught, at the intermediate portion. Therefore, it is possible to downsize the housing space for the harness in the steering device and also prevent the harness from being caught.

In a preferred embodiment of the present invention, the connector is U-shaped or substantially U-shaped. According to this structural arrangement, it is possible to arrange the intermediate portion of the harness so that a pointed portion that is easily caught on the rotor or on the stator is absent at the connector that connects together the first extension and the second extension from the first circumferential direction toward the second circumferential direction that is opposite to the first circumferential direction. This makes it possible to further prevent the harness from being caught.

In a preferred embodiment of the present invention, a total of a length of the first extension, a length of the second extension, and a length of the connector does not change in accordance with the rotation of the steering wheel, and, in this state, one of the first extension and the second extension is lengthened while the other one of the first extension and the second extension is shortened.

According to this structural arrangement, it is possible to enable the harness to follow the rotation of the steering wheel by changing the shape of the intermediate portion so as to change the ratio occupied by each of the first and second extensions in the intermediate portion without stretching or shrinking the intermediate portion. Therefore, there is no need to provide a helical portion, which is bulky and which is easily caught, at the intermediate portion. Therefore, it is possible to downsize the housing space for the harness in the steering device and also prevent the harness from being caught.

In a preferred embodiment of the present invention, the connector moves in the circumferential direction in accordance with the rotation of the steering wheel. According to this structural arrangement, the connector moves in the circumferential direction, and, as a result, the shape of the intermediate portion smoothly changes so that one of the first and second extensions is lengthened and so that the other one of the first and second extensions is shortened. Therefore, it is possible to prevent the intermediate portion, which is being deformed, from being caught on the rotor or on the stator.

In a preferred embodiment of the present invention, the length of the connector is unchanged even if the steering wheel rotates. According to this structural arrangement, it is possible to enable the harness to follow the rotation of the steering wheel by changing the shape of the intermediate portion so as to change the ratio occupied by each of the first and second extensions in the intermediate portion. Therefore, there is no need to provide a helical portion, which is bulky and which is easily caught, at the intermediate portion. Therefore, it is possible to downsize the housing space for the harness in the steering device and also prevent the harness from being caught.

In a preferred embodiment of the present invention, at least one of the rotor and the stator guides the first extension, the second extension, and the connector in the circumferential direction. According to this structural arrangement, the shape of the intermediate portion smoothly changes so as to change the ratio occupied by each of the first and second extensions in the intermediate portion by being guided by at least one of the rotor and the stator when the steering wheel rotates. Therefore, it is possible to prevent the intermediate portion, which is being deformed, from being caught on the rotor or on the stator.

In a preferred embodiment of the present invention, at least one of the rotor and the stator guides the first extension, the second extension, and the connector in a direction in which the rotational axis extends. According to this structural arrangement, the shape of the intermediate portion smoothly changes so as to change the ratio occupied by each of the first and second extensions in the intermediate portion by being guided by at least one of the rotor and the stator when the steering wheel rotates. Therefore, it is possible to prevent the intermediate portion, which is being deformed, from being caught on the rotor or on the stator.

In a preferred embodiment of the present invention, the length of the first extension and the length of the second extension are equal or substantially equal to each other when the steering wheel is in a neutral position in the circumferential direction when the steering device steers the vessel to travel straight.

According to this structural arrangement, when the vessel operator rotates the steering wheel from the neutral position in the first circumferential direction, one of the first and second extensions in the intermediate portion is lengthened, and the other one of the first and second extensions is shortened. When the vessel operator rotates the steering wheel from the neutral position in the second circumferential direction, one of the first and second extensions is shortened, and the other one of the first and second extensions is lengthened. When the steering wheel rotates from the neutral position to the maximum rotational angle in each of the first circumferential direction and the second circumferential direction, the length of the first extension and the length of the second extension reach an unchanged state.

When the steering wheel is in the neutral position, the length of the first extension and the length of the second extension are equal or substantially equal to each other. Therefore, the maximum rotational angle of the steering wheel when the steering wheel rotates from the neutral position in the first circumferential direction and the maximum rotational angle of the steering wheel when the steering wheel rotates from the neutral position in the second circumferential direction become the same value or substantially the same value. Therefore, it is possible to downsize the housing space for the harness in the steering device and also prevent the harness from being caught without providing an uncomfortable feeling to the vessel operator even if the vessel operator rotates the steering wheel from the neutral position in the first circumferential direction or in the second circumferential direction.

In a preferred embodiment of the present invention, at least one of the rotor and the stator defines a cylindrical containing space that houses the intermediate portion. This structural arrangement enables the first and second extensions, each of which extends along the circumferential direction, in the intermediate portion to be disposed along the cylindrical shape of the containing space. Thus, the intermediate portion smoothly deforms along the cylindrical shape of the containing space when the shape of the intermediate portion changes so that one of the first and second extensions is lengthened, and the other one of the first and second extensions is shortened in accordance with the rotation of the steering wheel. Therefore, it is possible to prevent the intermediate portion from being caught on the rotor or on the stator.

In a preferred embodiment of the present invention, the rotor includes a first circular-arc surface that extends in the circumferential direction. The stator includes a second circular-arc surface that extends in the circumferential direction and that defines the containing space between the first circular-arc surface and the second circular-arc surface.

This structural arrangement enables the first and second extensions, each of which extends along the circumferential direction, in the intermediate portion to be disposed along the first and second circular-arc surfaces each of which defines the containing space. Thus, the intermediate portion smoothly deforms along the first and second circular-arc surfaces when the shape of the intermediate portion changes so that one of the first and second extensions is lengthened, and the other one of the first and second extensions is shortened in accordance with the rotation of the steering wheel. Therefore, it is possible to prevent the intermediate portion from being caught on the rotor or on the stator.

In a preferred embodiment of the present invention, the harness further includes a first drawn portion and a second drawn portion. The first drawn portion is drawn out from a first end portion of the intermediate portion that is close to the first fastener to an outside of the containing space and is connected to the electrical component. The second drawn portion is drawn out from a second end portion of the intermediate portion that is close to the second fastener to the outside of the containing space and is connected to the target component. According to this structural arrangement, while providing, with the first and second drawn portions, an electric connection between the electrical component and the target component by the harness, it is possible to downsize the housing space for the harness in the steering device and also prevent the harness from being caught.

In a preferred embodiment of the present invention, a direction in which the rotational axis extends includes an up-down direction component. The rotor includes a cylindrical first peripheral wall that includes the first circular-arc surface and a ceiling wall that is joined to the first peripheral wall and that together define an internal space. The stator includes a second peripheral wall that includes the second circular-arc surface and that is disposed in the internal space and defines the containing space within the internal space and a bottom wall that is joined to the second peripheral wall and that faces the containing space from below. The first fastener is disposed at a lower surface of the ceiling wall. The second fastener is disposed at an upper surface of the bottom wall.

According to this structural arrangement, the containing space that houses the intermediate portion of the harness is defined between the cylindrical first peripheral wall of the rotor and the second peripheral wall of the stator disposed in the internal space of the rotor. The first fastener is disposed at the lower surface facing the containing space in the ceiling wall of the rotor, and the second fastener is disposed at the upper surface facing the containing space in the bottom wall of the stator. Thus, the intermediate portion between the first fastener and the second fastener in the harness is isolated from members disposed around the rotor by being housed in the containing space, and therefore it is possible to prevent the intermediate portion from being caught on members disposed around the rotor when the steering wheel rotates.

In a preferred embodiment of the present invention, the ceiling wall includes a first through-hole through which the first drawn portion passes. The bottom wall includes a second through-hole through which the second drawn portion passes. According to this structural arrangement, it is possible to connect the first drawn portion to the electrical component by drawing the first drawn portion out from the containing space through the first through-hole, and it is possible to connect the second drawn portion to the target component by drawing the second drawn portion out from the containing space through the second through-hole. Therefore, while providing, with the first and second drawn portions, an electric connection between the electrical component and the target component, it is possible to downsize the housing space for the harness in the steering device and also prevent the harness from being caught.

In a preferred embodiment of the present invention, the steering device further includes a first seal that closes a space between the first through-hole and the first drawn portion and a second seal that closes a space between the second through-hole and the second drawn portion. According to this structural arrangement, while preventing water from flowing from the first through-hole or from the second through-hole into the containing space, it is possible to downsize the housing space for the harness in the steering device and also prevent the harness from being caught.

In a preferred embodiment of the present invention, a gap is provided between the first peripheral wall and the bottom wall. According to this structural arrangement, when water flows into the containing space, it is possible to drain the water in the containing space via the gap between the first peripheral wall and the bottom wall. Therefore, while draining water from the containing space into which the water has flowed, it is possible to downsize the housing space for the harness in the steering device and also prevent the harness from being caught.

In a preferred embodiment of the present invention, the steering device further includes another fastener that fixes the first drawn portion to the rotor at a position different from a position of the first fastener. According to this structural arrangement, in the first drawn portion, a portion between the first fastener and the another fastener is not easily deformed when the steering wheel rotates. This makes it possible to reduce a deformed portion in the first drawn portion when the steering wheel rotates, and therefore it is possible to prevent the first drawn portion from being deformed and being caught on members disposed around the first drawn portion.

In a preferred embodiment of the present invention, the harness includes a plurality of covered electric wires bundled together. According to this structural arrangement, even if the harness includes the plurality of covered electric wires bundled together, it is possible to downsize the housing space for the harness in the steering device and also prevent the harness from being caught.

In a preferred embodiment of the present invention, the plurality of covered electric wires are connected to the electrical component through a waterproof connector. According to this structural arrangement, while securing waterproof properties by the waterproof connector at a connecting location between the plurality of covered electric wires and the electrical component, it is possible to downsize the housing space for the harness in the steering device and also prevent the harness from being caught.

In a preferred embodiment of the present invention, the steering device further includes an operator that rotates around the rotational axis together with the steering wheel. The electrical component includes a sensor that detects an operation of the operator. According to this structural arrangement, it is possible to downsize the housing space for the harness by which the sensor that detects the operation of the operator rotating together with the steering wheel and the target component are connected together, and it is possible to prevent the harness from being caught.

According to a preferred embodiment of the present invention, a steering device for vessels includes a steering wheel, a first operator, a second operator, a first electrical component, a second electrical component, a rotor, a stator, a first harness, and a second harness. The steering device further includes a first fastener, a second fastener, a third fastener, and a fourth fastener. The steering wheel is rotatable around a rotational axis. The first operator and the second operator rotate together with the steering wheel around the rotational axis. The first electrical component rotates together with the steering wheel around the rotational axis. The first electrical component includes a first sensor that detects an operation of the first operator. The second electrical component rotates together with the steering wheel around the rotational axis. The second electrical component includes a second sensor that detects an operation of the second operator. The rotor rotates together with the steering wheel around the rotational axis. The position of the stator in a circumferential direction around the rotational axis is stationary. The first harness connects a first target component, whose position in the circumferential direction is stationary, and the first sensor together. The second harness connects a second target component, whose position in the circumferential direction is stationary, and the second sensor together. The first fastener fixes the first harness to the rotor. The second fastener fixes the first harness to the stator. The third fastener fixes the second harness to the rotor. The fourth fastener fixes the second harness to the stator. A first intermediate portion between the first fastener and the second fastener in the first harness includes a first extension and a second extension, each of which extends in the circumferential direction, and a first connector. The first connector connects the first extension and the second extension together and curves from extending in a first circumferential direction of the circumferential direction to extending in a second circumferential direction of the circumferential direction opposite to the first circumferential direction. A second intermediate portion between the third fastener and the fourth fastener in the second harness includes a third extension and a fourth extension, each of which extends in the circumferential direction, and a second connector. The second connector connects the third extension and the fourth extension together and curves from extending in a first circumferential direction of the circumferential direction to extending in a second circumferential direction of the circumferential direction opposite to the first circumferential direction. One of the first extension and the second extension is lengthened while the other one of the first extension and the second extension is shortened in accordance with rotation of the steering wheel. One of the third extension and the fourth extension is lengthened while the other one of the third extension and the fourth extension is shortened in accordance with rotation of the steering wheel.

According to this structural arrangement, the first harness connects the first sensor, which is the first electrical component rotating around the rotational axis together with both the steering wheel and the first operator, and the first target component, whose position in the circumferential direction around the rotational axis is stationary, together. The second harness connects the second sensor, which is the second electrical component rotating around the rotational axis together with both the steering wheel and the second operator, and the second target component, whose position in the circumferential direction is stationary, together. The first harness is fixed to the rotor, which rotates together with the steering wheel, by the first fastener, and is fixed to the stator, whose position in the circumferential direction is stationary, by the second fastener. The second harness is fixed to the rotor by the third fastener, and is fixed to the stator by the fourth fastener.

In the first harness, the shape of the first intermediate portion between the first fastener and the second fastener changes in accordance with the relative movement in the circumferential direction of the rotor with respect to the stator because the first harness follows the rotation of the steering wheel when the vessel operator rotates the steering wheel in the circumferential direction. Additionally, in the second harness, the shape of the second intermediate portion between the third fastener and the fourth fastener changes in accordance with the relative movement in the circumferential direction of the rotor with respect to the stator because the second harness follows the rotation of the steering wheel.

More specifically, the shape of the first intermediate portion changes so that one of the first extension and the second extension, each of which extends along the circumferential direction, in the first intermediate portion is lengthened and so that the other one of the first extension and the second extension is shortened. Additionally, the shape of the second intermediate portion changes so that one of the third extension and the fourth extension, each of which extends along the circumferential direction, in the second intermediate portion is lengthened and so that the other one of the third extension and the fourth extension is shortened. In this case, it is possible to enable the first harness to follow the rotation of the steering wheel by changing the ratio occupied by each of the first and second extensions in the first intermediate portion without stretching or shrinking the first intermediate portion by using a helical portion described in Japanese Patent Application Publication No. 9-148028. Likewise, it is possible to enable the second harness to follow the rotation of the steering wheel by changing the ratio occupied by each of the third and fourth extensions in the second intermediate portion without stretching or shrinking the second intermediate portion by using a helical portion.

Therefore, there is no need to provide a helical portion, which is bulky and which is easily caught, at the first intermediate portion and at the second intermediate portion. Therefore, it is possible to downsize the housing space for both the first harness and the second harness in the steering device and also prevent the first harness and the second harness from being caught.

In a preferred embodiment of the present invention, the first connector and the second connector extend in a same direction that is the first circumferential direction or the second circumferential direction. According to this structural arrangement, while deforming both the first intermediate portion of the first harness and the second intermediate portion of the second harness in the same way when the steering wheel rotates, it is possible to downsize the housing space for the first and second harnesses and also prevent the first and second harnesses from being caught.

In a preferred embodiment of the present invention, the first connector and the second connector extend in the first circumferential direction. An end portion of the first connector is positioned downstream of the first extension and the second extension in the first circumferential direction. An end portion of the second connector is positioned downstream of the third extension and the fourth extension in the first circumferential direction.

According to this structural arrangement, in the first harness, it is possible to smoothly connect the first connector to the first and second extensions so that a pointed portion that is easily caught on the rotor or on the stator is absent around a connecting location between each of the first and second extensions and the first connector. Additionally, in the second harness, it is possible to smoothly connect the second connector to the third and fourth extensions so that a pointed portion is absent around a connecting location between each of the third and fourth extensions and the second connector. This makes it possible to further prevent the first harness and the second harness from being caught.

In a preferred embodiment of the present invention, the first intermediate portion and the second intermediate portion are disposed apart from each other in the circumferential direction. According to this structural arrangement, in the first and second intermediate portions, it is possible to prevent the first harness and the second harness from being caught on each other.

In a preferred embodiment of the present invention, when a vessel on which the steering device is mounted travels straight, the steering wheel is placed at a neutral position in the circumferential direction. Even if a rotational angle of the steering wheel reaches a maximum value when the steering wheel rotates from the neutral position, the first connector and each of the third and fourth extensions are disposed apart from each other in the circumferential direction. Even if a rotational angle of the steering wheel reaches a maximum value when the steering wheel rotates from the neutral position, the second connector and each of the first and second extensions are disposed apart from each other in the circumferential direction.

According to this structural arrangement, it is possible to prevent the first harness and the second harness from being caught on each other even when the rotational angle of the steering wheel reaches the maximum value after the steering wheel rotates from the neutral position.

In a preferred embodiment of the present invention, when the steering wheel rotates from the neutral position and when the rotational angle of the steering wheel reaches the maximum value, at least a portion of the first intermediate portion and the second intermediate portion are disposed apart from each other in the circumferential direction. According to this structural arrangement, in a state in which the rotational angle of the steering wheel has reached the maximum value when the steering wheel rotates from the neutral position, it is possible to reduce a mutually overlapped portion of the first and second intermediate portions, and therefore it is possible to prevent the first harness and the second harness from being caught on each other.

In a preferred embodiment of the present invention, the first operator and the second operator define and a left and right pair of paddle switches. According to this structural arrangement, in the steering device including the left and right pair of paddle switches, it is possible to downsize the housing space for both the first harness and the second harness and also prevent the first harness and the second harness from being caught.

In a preferred embodiment of the present invention, the first operator is operated by a vessel operator in order to generate a thrust that makes a vessel on which the steering device is mounted travel forward. The second operator is operated by the vessel operator in order to generate a thrust that makes the vessel travel in reverse. According to this structural arrangement, in the steering device in which the left and right paddle switches are operated to generate a thrust that makes the vessel travel forward and in reverse, it is possible to downsize the housing space for the first harness and the second harness and also prevent the first harness and the second harness from being caught.

In a preferred embodiment of the present invention, the first target component and the second target component are the same component. According to this structural arrangement, the target component and the first sensor that is the first electrical component are connected together by the first harness, and this target component and the second sensor that is the second electrical component are connected together by the second harness. In this structural arrangement, it is possible to downsize the housing space for both the first harness and the second harness and also prevent the first harness and the second harness from being caught.

According to a preferred embodiment of the present invention, a vessel includes the steering device described above. According to this structural arrangement, in the steering device for the vessel, it is possible to downsize the housing space for the harness and also prevent the harness from being caught.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a cross-sectional view of a harness included in the steering device for vessels.

FIG. 6 is a cross-sectional view of a harness according to a modified preferred embodiment of the present invention.

FIG. 10 is a plan view showing an arrangement of an outboard-motor watercraft that is another example of a vessel according to a preferred embodiment of the present invention.

DETAILED DESCRIPTION OF THE PREFERRED EMBODIMENTS

Preferred embodiments of the present invention will be hereinafter described in detail with reference to the accompanying drawings.

Figure 1:
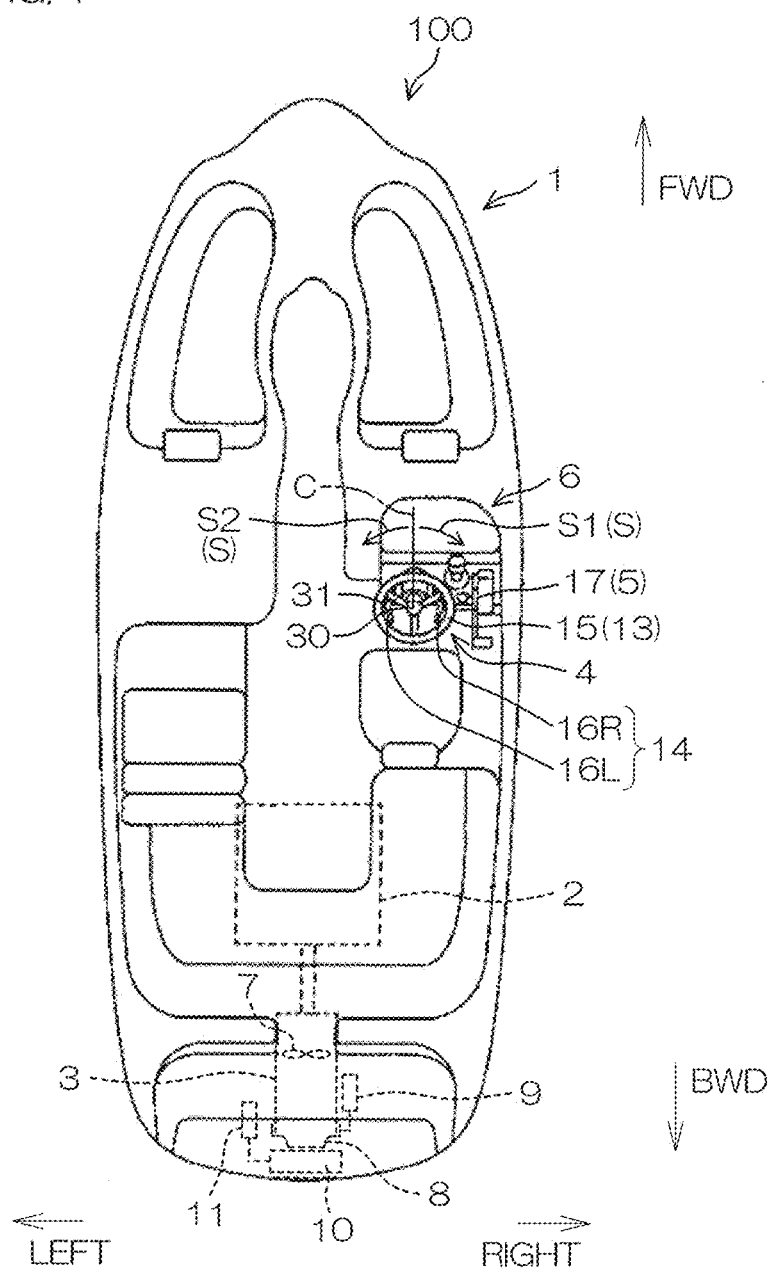
FIG. 1 is a plan view showing an arrangement of a jet propulsion watercraft that is an example of a vessel according to a preferred embodiment of the present invention.

FIG. 1 is a plan view showing a structural arrangement of a jet propulsion watercraft 100 that is an example of a vessel according to a preferred embodiment of the present invention. In FIG. 1, a forward direction (stem direction) of the jet propulsion watercraft 100 is indicated by an arrow FWD, and its reverse direction (stern direction) is indicated by an arrow BWD. Additionally, a starboard-side direction of the jet propulsion watercraft 100 is indicated by an arrow RIGHT, and its port-side direction is indicated by an arrow LEFT.

The jet propulsion watercraft 100 includes a hull 1, an engine 2 stored in the hull 1, and a jet propulsion machine 3 joined to the engine 2. The jet propulsion watercraft 100 additionally includes a steering device for vessels 4 (hereinafter, referred to simply as "steering device 4") and a lever operation portion 5. The engine 2, the jet propulsion machine 3, the steering device 4, and the lever operation portion 5 define a vessel operation system. Additionally, the engine 2 and the jet propulsion machine 3 define a propulsion device.

The engine 2 and the jet propulsion machine 3 are disposed inside the hull 1. An intake port that supplies water to the jet propulsion machine 3 is disposed at a lower portion of the hull 1. A console 6 that enables a vessel operator (user) to operate the jet propulsion watercraft 100 is provided on the hull 1. The steering device 4 and the lever operation portion 5 are mounted on the jet propulsion watercraft 100 by being included in the console 6.

The jet propulsion machine 3 is configured to be driven by the engine 2 and to provide a thrust to the hull 1. More specifically, the jet propulsion machine 3 is actuated by a driving force transmitted from the engine 2, and generates a jet flow while jetting water that has been taken in from the intake port. The jet propulsion machine 3 includes an impeller 7 that rotates and generates a jet flow by being driven by the engine 2 and a jet nozzle 8 that discharges a jet flow generated by the impeller 7.

A nozzle actuator 9 that turns the jet nozzle 8 rightward and leftward so as to change the discharge direction of a jet flow is attached to the jet propulsion machine 3. The nozzle actuator 9 is an example of a steering element.

A bucket 10 that is able to be disposed at a position at which a discharge port of the jet nozzle 8 is covered by facing the discharge port and a bucket actuator 11 that turns the bucket 10 upwardly and downwardly are additionally attached to the jet propulsion machine 3. The bucket actuator 11 turns the bucket 10 to a reverse position at which the discharge port of the jet nozzle 8 is covered and to a forward position at which the discharge port of the jet nozzle 8 is not covered. The bucket 10 and the bucket actuator 11 define a forward-reverse switching device. The bucket 10 in the forward position recedes from a jet flow jetted from the jet nozzle 8, and therefore its jet flow is jetted backwardly from the hull 1. A thrust in the forward direction is provided to the hull 1 by the reaction of its jet flow. The bucket 10 in the reverse position converts the direction of a jet flow jetted from the jet nozzle 8 into a direction that includes a forwardly-proceeding component. As a result, a thrust in the reverse direction is provided to the hull 1.

This structural arrangement makes it possible to adjust the discharge direction of a jet flow discharged from the discharge port of the jet nozzle 8 at an arbitrary position in a horizontal plane including a front-rear direction.

The steering device 4 includes a steering operation portion 13 that controls the traveling direction of the jet propulsion watercraft 100 and a paddle operation portion 14 that controls a throttle of the engine 2 and a position (shift) of the bucket 10. The steering operation portion 13 includes a steering wheel 15.

The steering wheel 15 is an operation member to change the direction of a thrust generated by the jet propulsion machine 3. The steering wheel 15 is arranged to be rotatable around a rotational axis C. A circumferential direction around the rotational axis C is referred to as a "circumferential direction S," and a radial direction that centers on the rotational axis C is referred to as a "radial direction R" (see FIG. 3 described below). The circumferential direction S includes a first circumferential direction S1 that is one direction of the circumferential direction S and a second circumferential direction S2 that is another direction opposite to the first circumferential direction S1. In the present preferred embodiment, when viewed from the vessel operator who operates the steering wheel 15, the first circumferential direction S1 is a clockwise direction (right-rotation direction), and the second circumferential direction S2 is a counterclockwise direction (left-rotation direction). However, these first and second circumferential directions S1 and S2 may be mutually reversed, i.e., may be a counterclockwise direction and a clockwise direction, respectively.

When the steering wheel 15 is in a neutral position in the circumferential direction S, the discharge port of the jet nozzle 8 is directed backwardly. In this state, when the bucket 10 is in the forward position, the jet propulsion watercraft 100 travels straight forward. On the other hand, in a state in which the steering wheel 15 is in the neutral position, when the bucket 10 is in the reverse position, the jet propulsion watercraft 100 travels straight backward. The nozzle actuator 9 turns the jet nozzle 8 rightward and leftward by the vessel operator rotating the steering wheel 15 rightward and leftward from the neutral position. When the vessel operator causes the steering wheel 15 to rotate right, the discharge port of the jet nozzle 8 is steered rightward. When the vessel operator causes the steering wheel 15 to rotate left, the discharge port of the jet nozzle 8 is steered leftward. The steering wheel 15 preferably has a circular shape in the present preferred embodiment, but may have a substantially circular-arc shape.

The steering wheel 15 is rotatable around the rotational axis C within the range of ±maximum value $\theta$ from the neutral position. In the present preferred embodiment, the maximum value $\theta$ is preferably an angle that exceeds 90 degrees, and may be, for example, a maximum value $\theta=135$ degrees, for example. In this case, the steering wheel 15 is rotatable in an angular range of 270 degrees, for example.

The paddle operation portion 14 includes a first operator and a second operator, i.e., a right operator 16R and a left operator 16L (hereinafter, referred to generically as "operator 16" when necessary) each of which rotates together with the steering wheel 15 around the rotational axis C. The right operator 16R and the left operator 16L include a left and right pair of paddle switches. The right operator 16R and the left operator 16L are disposed behind the steering wheel 15 when viewed from the vessel operator. In a state in which the steering wheel 15 is in the neutral position (see FIG. 1), the right operator 16R is positioned on the right side with respect to the rotational axis C. The right operator 16R is designed to be operated by the right hand of the vessel operator. In a state in which the steering wheel 15 is in the neutral position, the left operator 16L is positioned on the left side with respect to the rotational axis C. The left operator 16L is designed to be operated by the left hand of the vessel operator. The right operator 16R and the left operator 16L are disposed laterally symmetrical with respect to the rotational axis C when the steering wheel 15 is in the neutral position (i.e., the operational angle is a neutral angle).

Figure 3:
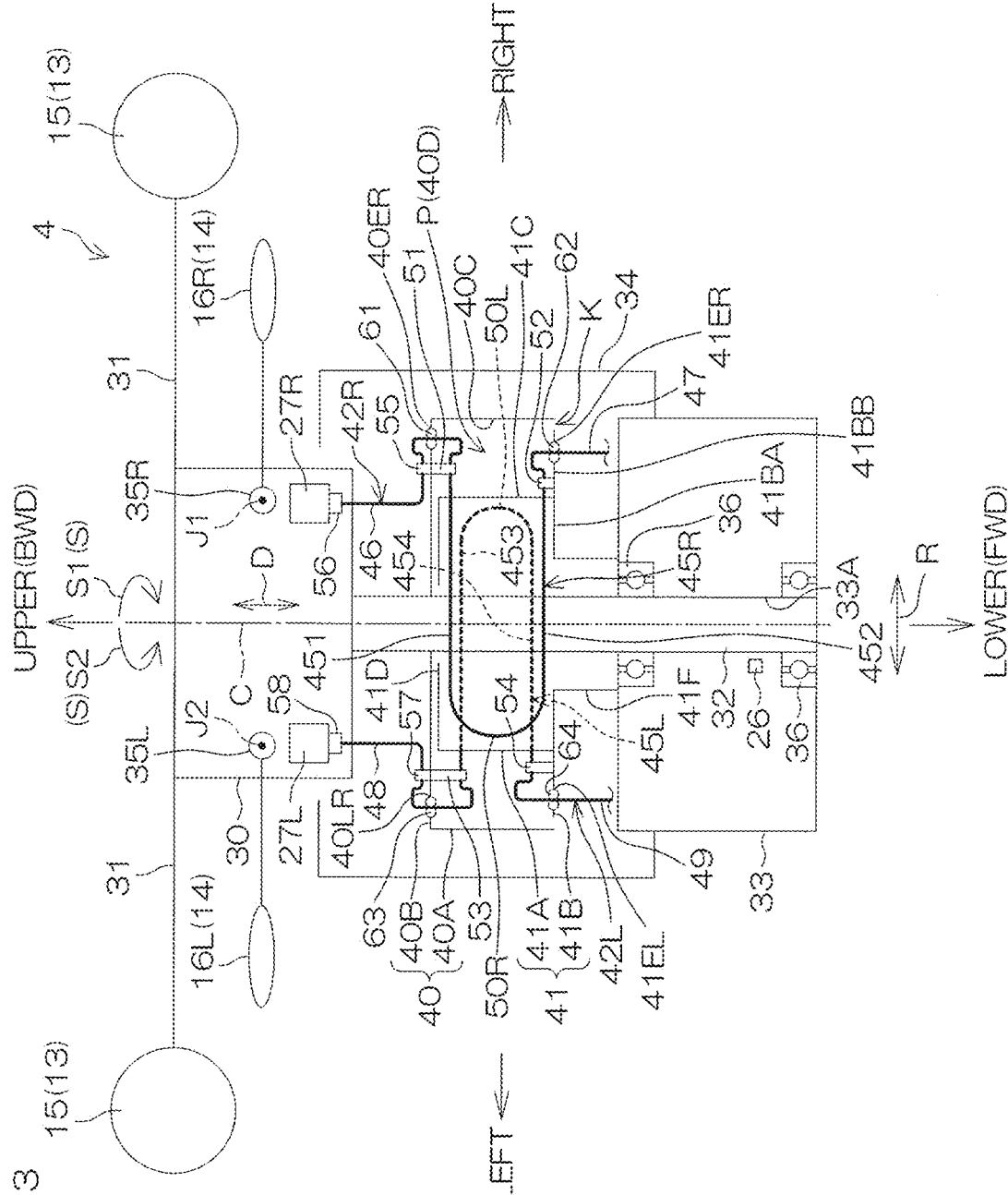
FIG. 3 is a schematic view showing an arrangement of a steering device for vessels included in the jet propulsion watercraft.

The right operator 16R is turnable around a first turning axis J1 that is perpendicular or substantially perpendicular to the rotational axis C, and the left operator 16L is turnable around a second turning axis J2 that is perpendicular or substantially perpendicular to the rotational axis C (see FIG. 3).

The throttle of the engine 2 and the bucket actuator 11 are controlled in accordance with the operation of the right operator 16R by the vessel operator. More specifically, when the right operator 16R is operated, the bucket actuator 11 is controlled to dispose the bucket 10 at the forward position. Additionally, the opening degree of the throttle of the engine 2 is controlled in accordance with the amount of operation of the right operator 16R. Therefore, the right operator 16R is an example of the first operator that is able to generate a thrust in the forward direction from the jet propulsion machine 3 by its operation and that is able to adjust the magnitude of the thrust by its operation.

Likewise, the throttle of the engine 2 and the bucket actuator 11 are controlled in accordance with the operation of the left operator 16L by the vessel operator. More specifically, when the left operator 16L is operated, the bucket actuator 11 is controlled to dispose the bucket 10 at the reverse position. Additionally, the opening degree of the throttle of the engine 2 is controlled in accordance with the amount of operation of the left operator 16L. Therefore, the left operator 16L is an example of the second operator that is able to generate a thrust in the reverse direction from the jet propulsion machine 3 by its operation and that is able to adjust the magnitude of the thrust by its operation.

The lever operation portion 5 operates the vessel in the same or similar way as the paddle operation portion 14. In other words, the lever operation portion 5 is an operating device that performs adjustment of the throttle opening degree of the engine 2 and that performs forward-reverse switching. The lever operation portion 5 includes a lever 17 that is moved by the vessel operator.

Figure 2:
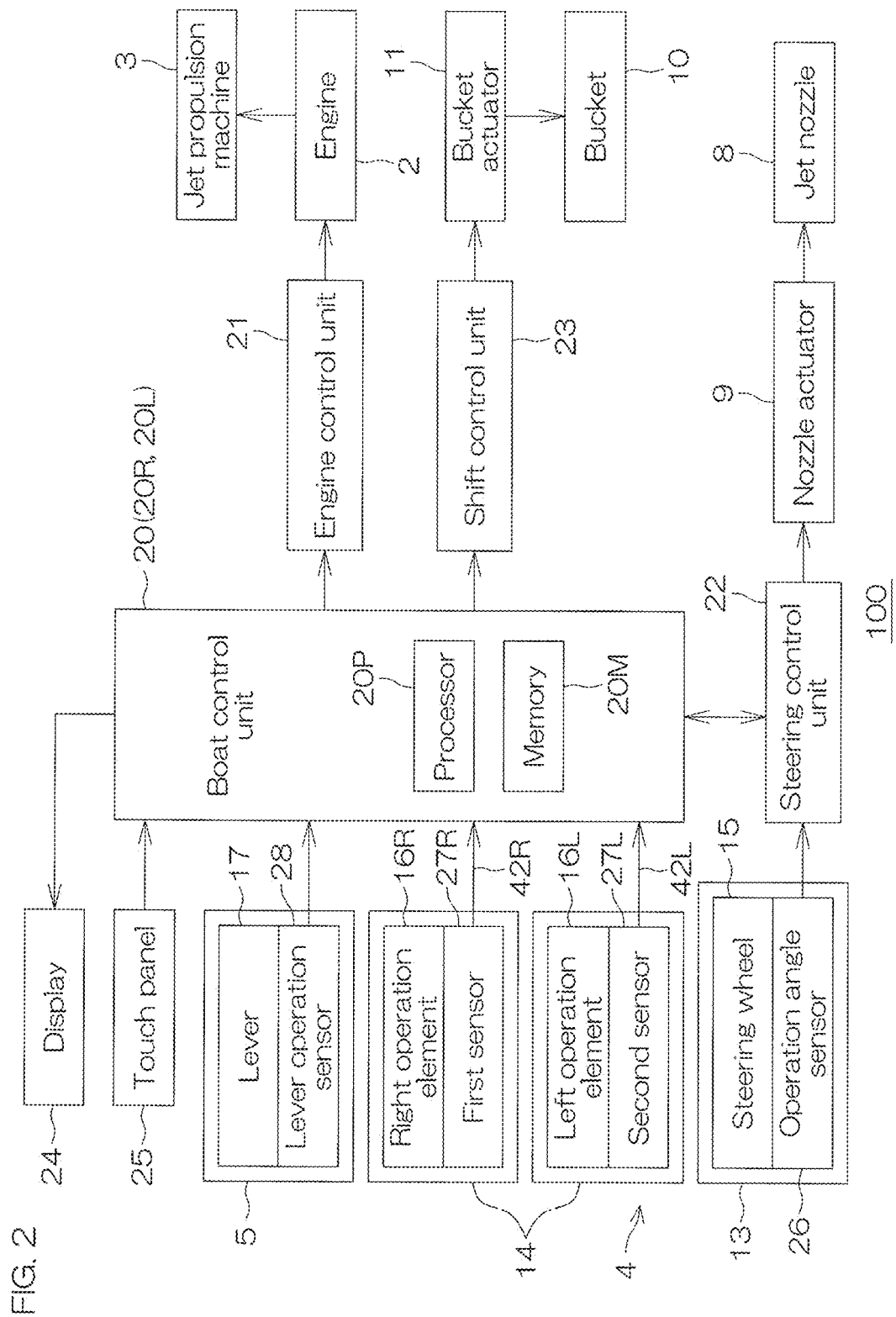
FIG. 2 is a block diagram showing an electrical configuration of the jet propulsion watercraft.

FIG. 2 is a block diagram showing an electrical configuration of the jet propulsion watercraft 100. The jet propulsion watercraft 100 additionally includes a boat control unit 20 that defines and functions as a controller, an engine control unit 21, a steering control unit 22, a shift control unit 23, a display 24, and a touch panel 25.

The boat control unit 20 may preferably be a microcomputer, and includes a processor 20P (CPU) and a memory 20M (e.g., ROM, RAM, flash memory, and so on). Programs to be executed by the processor 20P are stored in the memory 20M. The processor 20P executes the programs, and, as a result, the boat control unit 20 executes various control operations while using detection signals of various sensors included in the jet propulsion watercraft 100 as inputs.

The engine control unit 21 controls the engine 2. More specifically, the engine control unit 21 controls the throttle opening degree of the engine 2 in accordance with a command signal emitted from the boat control unit 20, and thus controls the output of the engine 2.

The steering operation portion 13 includes an operation angle sensor 26 that detects the rotation angle (operation angle) of the steering wheel 15. An output signal of the operation angle sensor 26 is input into the steering control unit 22. The steering control unit 22 drives the nozzle actuator 9 in accordance with the output signal of the operation angle sensor 26, and thus controls the steering angle of the jet nozzle 8. The boat control unit 20 communicates with the steering control unit 22, and obtains an operation angle (operation position) detected by the operation angle sensor 26, i.e., obtains information about a rotation position around the rotational axis C.

The nozzle actuator 9 generates a driving force to move the jet nozzle 8 rightward and leftward. The nozzle actuator 9 may be an electrically-operated actuator including an electric motor, for example. The steering control unit 22 controls the nozzle actuator 9. The steering control unit 22 may include, for example, a driver circuit that drives the nozzle actuator 9 and a microcomputer that inputs a control signal into the driver circuit. The steering control unit 22 drives the nozzle actuator 9, and thus turns the jet nozzle 8 rightward and leftward.

In relation to the shift control unit 23, the bucket actuator 11 generates a driving force to move the bucket 10. The bucket actuator 11 may be an electrically-operated actuator including an electric motor, for example. The shift control unit 23 may include, for example, a driver circuit that drives the bucket actuator 11 and a microcomputer that inputs a control signal into the driver circuit. The shift control unit 23 drives the bucket actuator 11, and thus moves the bucket 10 between the forward position and the reverse position.

The paddle operation portion 14 additionally includes a first sensor 27R that detects the operation of the right operator 16R by the vessel operator by detecting a turning angle of the right operator 16R. The paddle operation portion 14 additionally includes a second sensor 27L that detects the operation of the left operator 16L by the vessel operator by detecting a turning angle of the left operator 16L. The first sensor 27R and the second sensor 27L (hereinafter, referred to generically as "sensor 27" when necessary) may be, for example, position sensors each of which detects the operation position of its corresponding operator 16. The output signal of the first sensor 27R and the output signal of the second sensor 27L are input into the boat control unit 20. The boat control unit 20 causes the shift control unit 23 to control the bucket actuator 11 in accordance with an output signal of the first sensor 27R and an output signal of the second sensor 27L. Additionally, the boat control unit 20 provides an output adjustment command to the engine control unit 21 in accordance with an output signal of the first sensor 27R and an output signal of the second sensor 27L. The engine control unit 21 controls the throttle opening degree in accordance with an output adjustment command. Thus, the output (the number of rotations) of the engine 2 is adjusted.

The lever operation portion 5 additionally includes a lever operation sensor 28 that detects the position of the lever 17. The lever operation sensor 28 may be, for example, a position sensor that detects the operation position of the lever 17. The output signal of the lever operation sensor 28 is input into the boat control unit 20. The boat control unit 20 causes the shift control unit 23 to control the bucket actuator 11 in accordance with an output signal of the lever operation sensor 28. Additionally, the boat control unit 20 provides an output adjustment command to the engine control unit 21 in accordance with an output signal of the lever operation sensor 28. The engine control unit 21 controls the throttle opening degree in accordance with an output adjustment command. Thus, the output (the number of rotations) of the engine 2 is adjusted.

The display 24 may be a liquid crystal display device, for example, disposed at the console 6 (see FIG. 1). A touch panel 25 is provided on a display screen of the display 24. The vessel operator is able to select either a vessel operation (specifically, shift selection and output adjustment) performed by the paddle operation portion 14 or a vessel operation performed by the lever operation portion 5 by operating the touch panel 25. Either the vessel operation performed by the paddle operation portion 14 or the vessel operation performed by the lever operation portion 5 may be selected, respectively, by operating the paddle operation portion 14 and the lever operation portion 5 besides the selection made by the touch panel 25.

FIG. 3 is a schematic view to describe an structural arrangement of the steering device 4. The steering device 4 additionally includes a hub 30 disposed in a space surrounded by the steering wheel 15 and a plurality of spokes 31 that extend radially from the hub 30 and that is connected to the steering wheel 15. The hub 30 and the spoke 31 may be regarded as elements of the steering wheel 15. The steering device 4 additionally includes a shaft 32 that extends from the hub 30, a support portion 33 that supports the shaft 32, and a cylindrical columnar tube 34 that surrounds a portion between the hub 30 and the support portion 33 in the shaft 32.

The hub 30 includes, for example, a cylindrical hollow body, and is disposed coaxially with the steering wheel 15 and with the shaft 32. The rotational axis C of the steering wheel 15 passes through the hub 30 and the shaft 32. The rotational axis C extends in the front-rear direction, and, more specifically, is tilted with respect to a horizontal direction so as to extend more upwardly than backwardly. Therefore, a direction (hereinafter, referred to as "axial direction D") in which the rotational axis C extends includes up and down direction components.

In a state in which the steering wheel 15 is in the neutral position (see FIG. 3), a connector 35R that turnably connects the right operator 16R to the hub 30 is disposed at a right portion of the hub 30. A connector 35L that turnably connects the left operator 16L to the hub 30 is disposed at a left portion of the hub 30. In the hub 30, the first sensor 27R is disposed near the connector 35R, and the second sensor 27L is disposed near the connector 35L. These sensors 27 are examples of a plurality of electrical components included in the steering device 4. Particularly, the first sensor 27R is an example of a first electrical component that is an element of the plurality of electrical components, and the second sensor 27L is an example of a second electrical component that is an element of the plurality of electrical components.

The support portion 33 is a hollow body that includes an insertion hole 33A into which a lower portion of the shaft 32 is inserted, and the support portion 33 is disposed below the hub 30, and is fixed to the console 6. A bearing 36 is disposed around the insertion hole 33A in the support portion 33. The lower portion of the shaft 32 is supported by the support portion 33 through the bearing 36. Thus, the steering wheel 15, the operator 16, the sensor 27, the hub 30, the spoke 31, and the shaft 32 are rotatable together around the rotational axis C. The operation angle sensor 26 is disposed in the support portion 33.

The columnar tube 34 is, for example, a cylinder disposed coaxially with the shaft 32. An upper end portion of the columnar tube 34 surrounds a lower portion of the hub 30 in a noncontact state. A lower end portion of the columnar tube 34 is fixed to the support portion 33 and surrounds an upper portion of the support portion 33 closer to the steering wheel 15. Thus, in the columnar tube 34, the position in a circumferential direction S is stationary.

The steering device 4 additionally includes a rotor 40 and a stator 41 that are disposed between the hub 30 and the support portion 33 and that are surrounded by the columnar tube 34.

Figure 4:
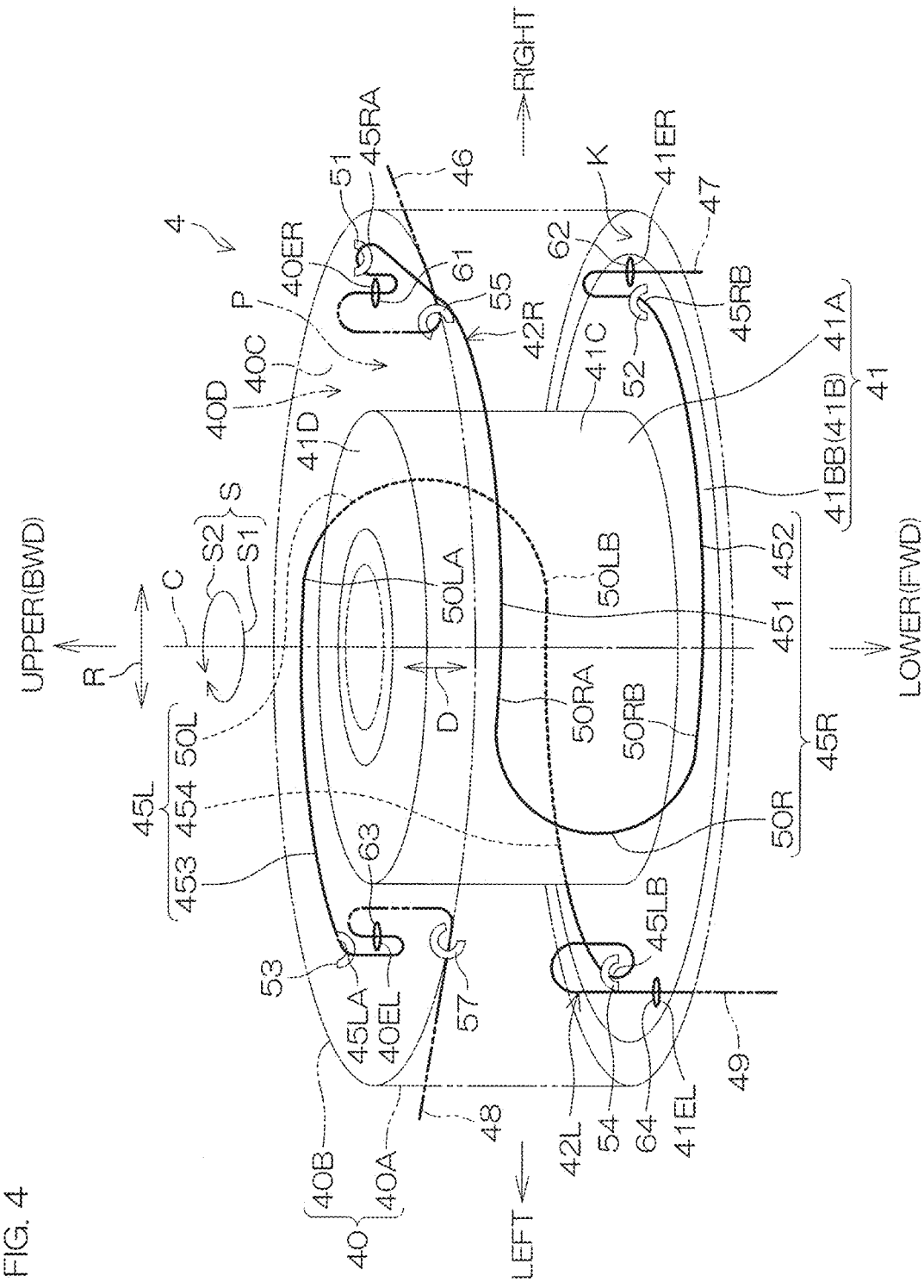
FIG. 4 is a perspective view of a main portion of the steering device for vessels.

FIG. 4 is a perspective view of both the rotor 40 and the stator 41. In FIG. 4, the rotor 40 is shown by an alternate long and two short dashed line, and the stator 41 is shown by a solid line, so that a space between the rotor 40 and the stator 41 is distinguishable. The rotor 40 includes a cylindrical first peripheral wall 40A that surrounds the shaft 32 and a ceiling wall 40B that is connected to the first peripheral wall 40A. The first peripheral wall 40A in the present preferred embodiment defines a cylinder that is disposed coaxially with the shaft 32 and that extends parallel or substantially parallel to the rotational axis C. A first circular-arc surface 40C that extends in the circumferential direction S is disposed in at least one portion of an inner peripheral surface of the first peripheral wall 40A. In the present preferred embodiment, the whole area of the inner peripheral surface of the first peripheral wall 40A defines the first circular-arc surface 40C, and the first circular-arc surface 40C has a circularly or substantially circularly cylindrical shape. The ceiling wall 40B is annular and projects inwardly in the radial direction R from an upper end close to the steering wheel 15 in the first peripheral wall 40A. The rotor 40 includes an internal space 40D defined by the first peripheral wall 40A and by the ceiling wall 40B. The first peripheral wall 40A surrounds the internal space 40D, and the ceiling wall 40B closes the internal space 40D from above. An inner peripheral edge of the ceiling wall 40B is fixed to the shaft 32 (see FIG. 3). Therefore, the rotor 40 is rotatable together with the shaft 32 and the steering wheel 15 around the rotational axis C.

A first through-hole 40ER and a first through-hole 40EL (hereinafter, referred to generically as "first through-hole 40E" when necessary) each of which passes through the ceiling wall 40B in an upward and downward direction are provided in an outer peripheral portion of the ceiling wall 40B of the rotor 40. The first through-hole 40ER and the first through-hole 40EL are disposed apart from each other in the circumferential direction S, and an interval between the first through-holes 40ER and 40EL is, for example, about 180 degrees. In a state in which the steering wheel 15 is in the neutral position (see FIG. 4), the first through-hole 40ER is positioned on the right side with respect to the rotational axis C, and the first through-hole 40EL is positioned on the left side with respect to the rotational axis C.

The stator 41 includes a cylindrical second peripheral wall 41A that surrounds the shaft 32 and a bottom wall 41B that is connected to the second peripheral wall 41A. The second peripheral wall 41A is a cylinder that is disposed coaxially with the shaft 32 and that extends parallel or substantially parallel to the rotational axis C, and the second peripheral wall 41A is disposed in the internal space 40D of the rotor 40. A second circular-arc surface 41C that extends in the circumferential direction S is disposed in at least one portion of an outer peripheral surface of the second peripheral wall 41A. In the present preferred embodiment, the whole area of the outer peripheral surface of the second peripheral wall 41A defines the second circular-arc surface 41C, and the second circular-arc surface 41C has a circularly or substantially circularly cylindrical shape. The second circular-arc surface 41C faces the first circular-arc surface 40C of the first peripheral wall 40A of the rotor 40 from the inward side in the radial direction R. Thus, a containing space P is defined between the first circular-arc surface 40C and the second circular-arc surface 41C. The containing space P defines a portion of the internal space 40D of the rotor 40. In the present preferred embodiment, both the first circular-arc surface 40C and the second circular-arc surface 41C have a circularly or substantially circularly cylindrical shape, and therefore the containing space P also has a circularly or substantially circularly cylindrical shape. The containing space P is closed by the outer peripheral portion of the ceiling wall 40B of rotor 40 from above. Although both the rotor 40 and the stator 41 define the containing space P in the present preferred embodiment, the containing space P may be defined by one of the rotor 40 and the stator 41.

An annular flange 41D that juts inwardly in the radial direction R is provided at an upper end of the second peripheral wall 41A. The flange 41D is adjacent to the ceiling wall 40B of the rotor 40 from below, and is disposed parallel or substantially parallel to the ceiling wall 40B. An inner peripheral edge of the flange 41D surrounds the shaft 32 in a noncontact state (see FIG. 3).

The bottom wall 41B includes an annular inner portion 41BA (see FIG. 3) that projects inwardly in the radial direction R from a lower end of the second peripheral wall 41A and an annular outer portion 41BB that projects outwardly in the radial direction R from the lower end of the second peripheral wall 41A and that faces the containing space P from below. An inner peripheral edge of the inner portion 41BA defines an inner peripheral edge of the bottom wall 41B, and an outer peripheral edge of the outer portion 41BB defines an outer peripheral edge of the bottom wall 41B. The inner peripheral edge of the bottom wall 41B surrounds the shaft 32 in a noncontact state (see FIG. 3). The outer diameter of the bottom wall 41B is smaller than the inner diameter of the first peripheral wall 40A of the rotor 40, and therefore an annular gap K that extends in the circumferential direction S is provided between the first peripheral wall 40A and the outer peripheral edge of the bottom wall 41B. The size of the gap K in the radial direction R is, for example, about 5 mm.

A second through-hole 41ER and a second through-hole 41EL (hereinafter, referred to generically as "second through-hole 41E" when necessary) each of which passes through the outer portion 41BB in an upward and downward direction are provided in the outer portion 41BB of the bottom wall 41B. The second through-hole 41ER and the second through-hole 41EL are disposed apart from each other in the circumferential direction S, and an interval between the second through-holes 41ER and 41EL is, for example, about 180 degrees. In a state in which the steering wheel 15 is in the neutral position, the second through-hole 41ER is positioned on the right side with respect to the rotational axis C, and the second through-hole 41EL is positioned on the left side with respect to the rotational axis C. In a state in which the steering wheel 15 is in the neutral position, the second through-hole 41ER and the first through-hole 40ER of the rotor 40 are located at the same position or at substantially the same position in the circumferential direction S, and the second through-hole 41EL and the first through-hole 40EL of the rotor 40 are located at the same position or at substantially the same position in the circumferential direction S.

The stator 41 additionally includes a cylindrical third peripheral wall 41F that extends downward from the inner peripheral edge of the bottom wall 41B (see FIG. 3). The third peripheral wall 41F is fixed to the support portion 33. Therefore, the position in the circumferential direction S of the stator 41 is stationary.

The steering device 4 additionally includes a first harness 42R by which the first sensor 27R and the boat control unit 20 are connected together and a second harness 42L by which the second sensor 27L and the boat control unit 20 are connected together. The boat control unit 20 is fixed to the hull 1, and does not rotate together with the steering wheel 15. Therefore, the boat control unit 20 is an example of a target component whose position in the circumferential direction S is stationary.

FIG. 5 and FIG. 6 are cross-sectional views of the first harness 42R and the second harness 42L (hereinafter, referred to generically as "harness 42" when necessary), respectively. Each harness 42 includes a plurality of covered electric wires 43 that are bundled together and a tube 44 that houses these covered electric wires 43. Each covered electric wire 43 includes an electric wire 43A and a covering 43B with which the electric wire 43A is covered. At least one of the covered electric wires 43 is a signal wire. At least one of the covered electric wires 43 may be a power supply wire, and, if so, the power supply wire is connected not to the boat control unit 20 but to a power source, such as a battery, provided in the hull 1. The power source is an example of the target component. The covering 43B and the tube 44 are each made of an insulating material, such as synthetic resin or rubber, for example. The tube 44 is an element of an outer coat of the harness 42. A known braided tube may be used as the tube 44. The cross section of the tube 44 may be circular or substantially circular as shown in FIG. 5, or may be a flat rectangular or substantially rectangular shape as shown in FIG. 6. The harness 42 is flexible.

A halfway portion of the first harness 42R and a halfway portion of the second harness 42L are housed in the containing space P between the rotor 40 and the stator 41 as shown in FIG. 4. The steering device 4 additionally includes a first fastener 51 that fixes the first harness 42R to the rotor 40 in the containing space P and a second fastener 52 that fixes the first harness 42R to the stator 41 in the containing space P. The steering device 4 additionally includes a third fastener 53 that fixes the second harness 42L to the rotor 40 in the containing space P and a fourth fastener 54 that fixes the second harness 42L to the stator 41 in the containing space P. The first fastener 51, the second fastener 52, the third fastener 53, and the fourth fastener 54 are each, for example, a hook bent in a circular-arc manner.

Each of the first fastener 51 and the third fastener 53 is preferably U-shaped or substantially U-shaped, and has both end portions connected to a lower surface of the ceiling wall 40B of the rotor 40, and extends downwardly from the lower surface of the ceiling wall 40B in the containing space P. The first fastener 51 is disposed near the first through-hole 40ER, and the third fastener 53 is disposed near the first through-hole 40EL. Therefore, the first fastener 51 and the third fastener 53 are disposed apart from each other in the circumferential direction S.

Each of the second and fourth fasteners 52 and 54 preferably has an inverted U-shape or a substantially inverted U shape, and has both end portions connected to an upper surface of the bottom wall 41B of the stator 41, and extends upwardly from the upper surface of the bottom wall 41B in the containing space P. The second fastener 52 is disposed near the second through-hole 41ER, and the fourth fastener 54 is disposed near the second through-hole 41EL. Therefore, the second fastener 52 and the fourth fastener 54 are disposed apart from each other in the circumferential direction S.

The first harness 42R includes a first intermediate portion 45R housed in the containing space P and both a first drawn portion 46 and a second drawn portion 47 that are drawn out from the containing space P. In FIG. 4, the first intermediate portion 45R is shown by a solid line, and the first and second drawn portions 46 and 47 are each shown by an alternate long and two short dashed line.

The first intermediate portion 45R includes a first extension 451 and a second extension 452, each of which extends in a first circumferential direction S1 along the circumferential direction S, and a first connector 50R that connects the first extension 451 and the second extension 452 together. The first extension 451 is disposed at a higher position than the second extension 452 in the containing space P. An upstream end portion in the first circumferential direction S1 of the first extension 451 defines a first end portion 45RA of the first intermediate portion 45R. An upstream end portion in the first circumferential direction S1 of the second extension 452 defines a second end portion 45RB of the first intermediate portion 45R opposite to the first end portion 45RA.

The first end portion 45RA is fixed by being sandwiched between the lower surface of the ceiling wall 40B of the rotor 40 and the first fastener 51. The second end portion 45RB is fixed by being sandwiched between the upper surface of the bottom wall 41B of the stator 41 and the second fastener 52. The first intermediate portion 45R is located between the first fastener 51 and the second fastener 52 in the first harness 42R.

The first connector 50R sets a downstream end in the first circumferential direction S1 of the first extension 451 as a starting point, and is downwardly curved in the shape of the letter U extending from the first circumferential direction S1 to extending in the second circumferential direction S2, and is connected to a downstream end in the first circumferential direction S1 of the second extension 452. Therefore, in the first connector 50R, one end portion 50RA connected to the downstream end of the first extension 451 and an opposite end portion 50RB connected to the downstream end of the second extension 452 are positioned downstream of the first extension 451 and the second extension 452 in the first circumferential direction S1.

The first drawn portion 46 is connected to the first end portion 45RA of the first intermediate portion 45R. For example, the first drawn portion 46 is curved downwardly from the first end portion 45RA, then curved upwardly, then passes through the first through-hole 40ER of the ceiling wall 40B of the rotor 40, and is drawn out from the containing space P. For example, a portion of the first drawn portion 46 that has been drawn out from the containing space P extends upwardly from the first through-hole 40ER, then curves downwardly, then further curves along an outer peripheral edge of the ceiling wall 40B, then separates from the rotor 40, and connects to the first sensor 27R.

The steering device 4 includes, separately from the first fastener 51, a fastener 55 by which the first drawn portion 46 is fixed to the rotor 40. The fastener 55 is disposed outside the containing space P, i.e., is disposed at a position different from the position of the first fastener 51. The fastener 55 is disposed near the first through-hole 40ER. The fastener 55 is preferably U-shaped or substantially U-shaped, both end portions of which are connected to, for example, an outer peripheral surface of the first peripheral wall 40A of the rotor 40 and an upper surface of the ceiling wall 40B of the rotor 40, respectively. A portion of the first drawn portion 46 along the outer peripheral edge of the ceiling wall 40B is fixed at a position different from the position of the first fastener 51 by being sandwiched between the rotor 40 and the fastener 55. The plurality of covered electric wires 43 in the first drawn portion 46 are connected to the first sensor 27R through a known waterproof connector 56 (see FIG. 3).

The second drawn portion 47 is connected to the second end portion 45RB of the first intermediate portion 45R. For example, the second drawn portion 47 is curved upwardly from the second end portion 45RB, then curved downwardly, then passes through the second through-hole 41ER of the bottom wall 41B of the stator 41, is then drawn out from the containing space P, and connected to the boat control unit 20.

The steering device 4 additionally includes a first seal 61 that closes a space between the first through-hole 40ER and the first drawn portion 46 and a second seal 62 that closes a space between the second through-hole 41ER and the second drawn portion 47. The first seal 61 and the second seal 62 each include, for example, a cylindrical grommet.

The second harness 42L includes a second intermediate portion 45L housed in the containing space P and a third drawn portion 48 and a fourth drawn portion 49 both of which are drawn out from the containing space P. In FIG. 4, the second intermediate portion 45L is shown by a solid line or a broken line, and the third drawn portion 48 and the fourth drawn portion 49 are each shown by an alternate long and two short dashed line. Hereinafter, the second intermediate portion 45L and the first intermediate portion 45R of the first harness 42R are referred to generically as "intermediate portion 45" when necessary. The first intermediate portion 45R and the second intermediate portion 45L are disposed apart from each other in the circumferential direction S in the containing space P.

The second intermediate portion 45L includes a third extension 453 and a fourth extension 454, each of which extends in the first circumferential direction S1 along the circumferential direction S, and a second connector 50L by which the third extension 453 and the fourth extension 454 are connected together. The third extension 453 is located at a higher position than the fourth extension 454 in the containing space P. An upstream end portion in the first circumferential direction S1 of the third extension 453 defines a first end portion 45LA of the second intermediate portion 45L. An upstream end portion in the first circumferential direction S1 of the fourth extension 454 defines a second end portion 45LB of the second intermediate portion 45L opposite to the first end portion 45LA.

The first end portion 45LA is fixed by being sandwiched between the lower surface of the ceiling wall 40B of the rotor 40 and the third fastener 53. The second end portion 45LB is fixed by being sandwiched between the upper surface of the bottom wall 41B of the stator 41 and the fourth fastener 54. The second intermediate portion 45L is located between the third fastener 53 and the fourth fastener 54 in the second harness 42L.

The second connector 50L sets a downstream end in the first circumferential direction S1 of the third extension 453 as a starting point, and is downwardly curved in the shape of the letter U extending in the first circumferential direction S1 to extending in the second circumferential direction S2, and is connected to a downstream end in the first circumferential direction S1 of the fourth extension 454. Therefore, in the second connector 50L, one end portion 50LA connected to the downstream end of the third extension 453 and an opposite end portion 50LB connected to the downstream end of the fourth extension 454 are positioned downstream of the third extension 453 and the fourth extension 454 in the first circumferential direction S1.

Hereinafter, the second connector 50L and the first connector 50R of the first harness 42R are referred to generically as "connector 50" when necessary. In the present preferred embodiment, both the first connector 50R and the second connector 50L extend in the first circumferential direction S1 in accordance with the first extension 451, the second extension 452, the third extension 453, and the fourth extension 454 each of which extends in the first circumferential direction S1. The first extension 451, the second extension 452, the third extension 453, and the fourth extension 454 may extend in the second circumferential direction S2, and, if so, both the first connector 50R and the second connector 50L extend in the second circumferential direction S2. In other words, the first connector 50R and the second connector 50L extend in the same direction, i.e., extend in the first circumferential direction S1, or extend in the second circumferential direction S2.

However, the third extension 453 and the fourth extension 454 may extend in the second circumferential direction S2 while the first extension 451 and the second extension 452 extend in the first circumferential direction S1. In this case, the second connector 50L downwardly curves in the shape of the letter U extending from the second circumferential direction S2 to extending in the first circumferential direction S1, and connects the third extension 453 and the fourth extension 454 together. Therefore, the first connector 50R and the second connector 50L are arranged to extend in mutually opposite directions.

The third drawn portion 48 is connected to the first end portion 45LA of the second intermediate portion 45L. For example, the third drawn portion 48 is curved downwardly from the first end portion 45LA, then curved upwardly, then passes through the first through-hole 40EL of the ceiling wall 40B of the rotor 40, and is drawn out from the containing space P. For example, a portion of the third drawn portion 48 that has been drawn out from the containing space P extends upwardly from the first through-hole 40EL, then curves downwardly, then further curves along the outer peripheral edge of the ceiling wall 40B, then separates from the rotor 40, and connected to the second sensor 27L.

The steering device 4 includes, separately from the third fastener 53, a fastener 57 by which the third drawn portion 48 is fixed to the rotor 40. The fastener 57 is disposed outside the containing space P, i.e., is disposed at a position different from the position of the third fastener 53. The fastener 57 is disposed near the first through-hole 40EL. The fastener 57 is preferably U-shaped or substantially U-shaped, both end portions of which are connected to, for example, the outer peripheral surface of the first peripheral wall 40A of the rotor 40 and the upper surface of the ceiling wall 40B of the rotor 40, respectively. A portion of the third drawn portion 48 along the outer peripheral edge of the ceiling wall 40B is fixed at a position different from the position of the third fastener 53 by being sandwiched between the rotor 40 and the fastener 57. The plurality of covered electric wires 43 in the third drawn portion 48 are connected to the second sensor 27L through a known waterproof connector 58 (see FIG. 3).

The fourth drawn portion 49 is connected to the second end portion 45LB of the second intermediate portion 45L. For example, the fourth drawn portion 49 is curved upwardly from the second end portion 45LB, then curved downwardly, then passes through the second through-hole 41EL of the bottom wall 41B of the stator 41, is then drawn out from the containing space P, and connected to the boat control unit 20.

The boat control unit 20 may be divided into a first target component 20R to which the first harness 42R is connected and a second target component 20L to which the second harness 42L is connected (see FIG. 2). In the present preferred embodiment, the first target component 20R and the second target component 20L are preferably the same component.

The steering device 4 additionally includes a third seal 63 that closes a space between the first through-hole 40EL and the third drawn portion 48, and a fourth seal 64 that closes a space between the second through-hole 41EL and the fourth drawn portion 49. The third seal 63 and the fourth seal 64 each include, for example, a cylindrical grommet.

The first intermediate portion 45R of the first harness 42R and the second intermediate portion 45L of the second harness 42L are deformed in the containing space P between the rotor 40 and the stator 41 in accordance with the rotation of the steering wheel 15. Therefore, a description will be hereinafter provided of the deformation of the intermediate portion 45 according to the rotation of the steering wheel 15. Although attention is paid mainly to the first intermediate portion 45R in the following description, the second intermediate portion 45L is deformed in the same or similar way as the first intermediate portion 45R.

Figure 7:
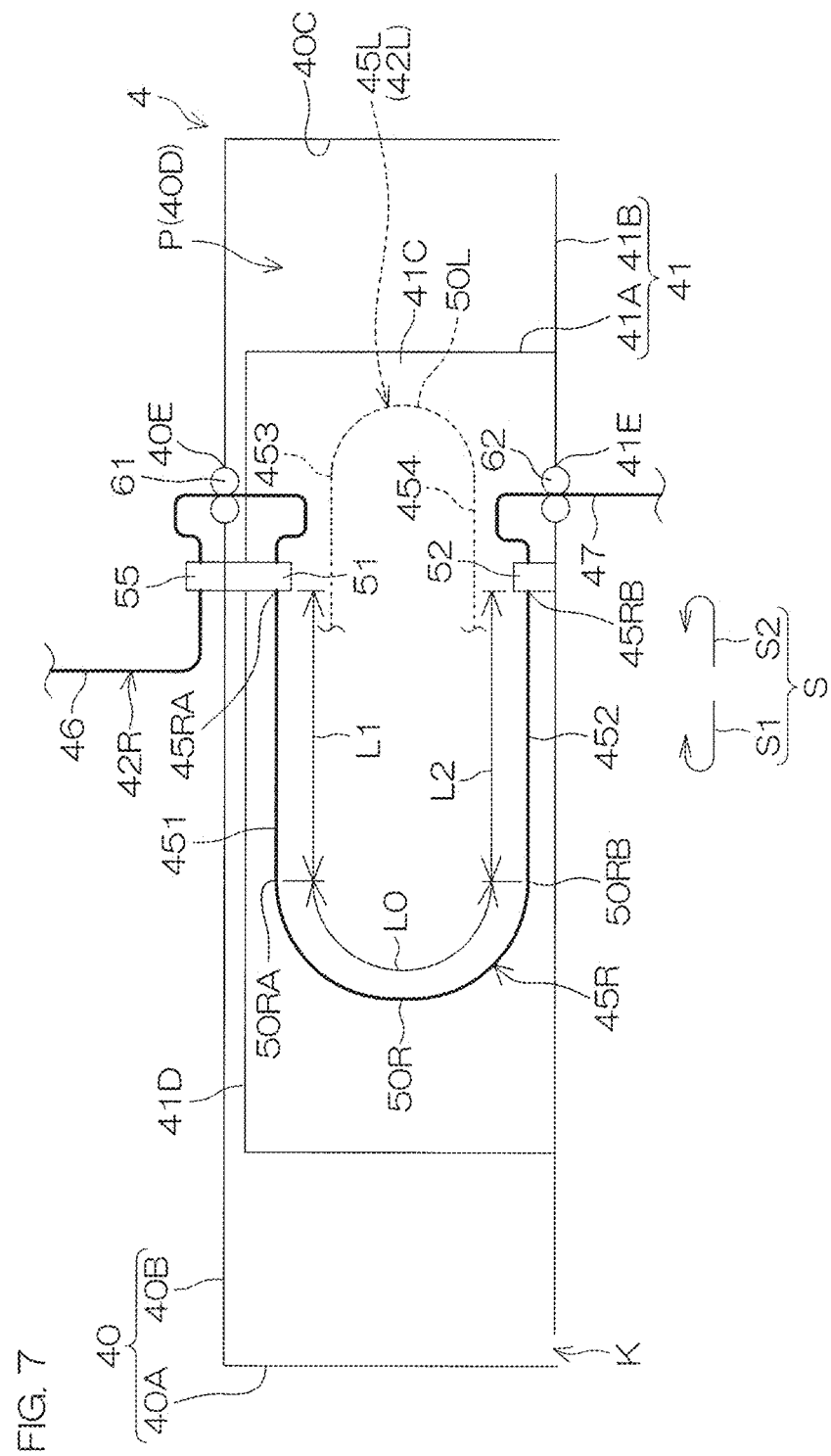
FIG. 7 is a view showing the main portion of the steering device for vessels when a steering wheel is in a neutral position.

FIG. 7 is a view showing a main portion of the steering device 4 seen from outward in the radial direction R when the steering wheel 15 is in the neutral position. In the first intermediate portion 45R of the first harness 42R when the steering wheel 15 is in the neutral position, the length L1 of the first extension 451 and the length L2 of the second extension 452 are equal or substantially equal to each other. Additionally, in the second intermediate portion 45L of the second harness 42L when the steering wheel 15 is in the neutral position, the length of the third extension 453 and the length of the fourth extension 454 are equal or substantially equal to each other.

Figure 8:
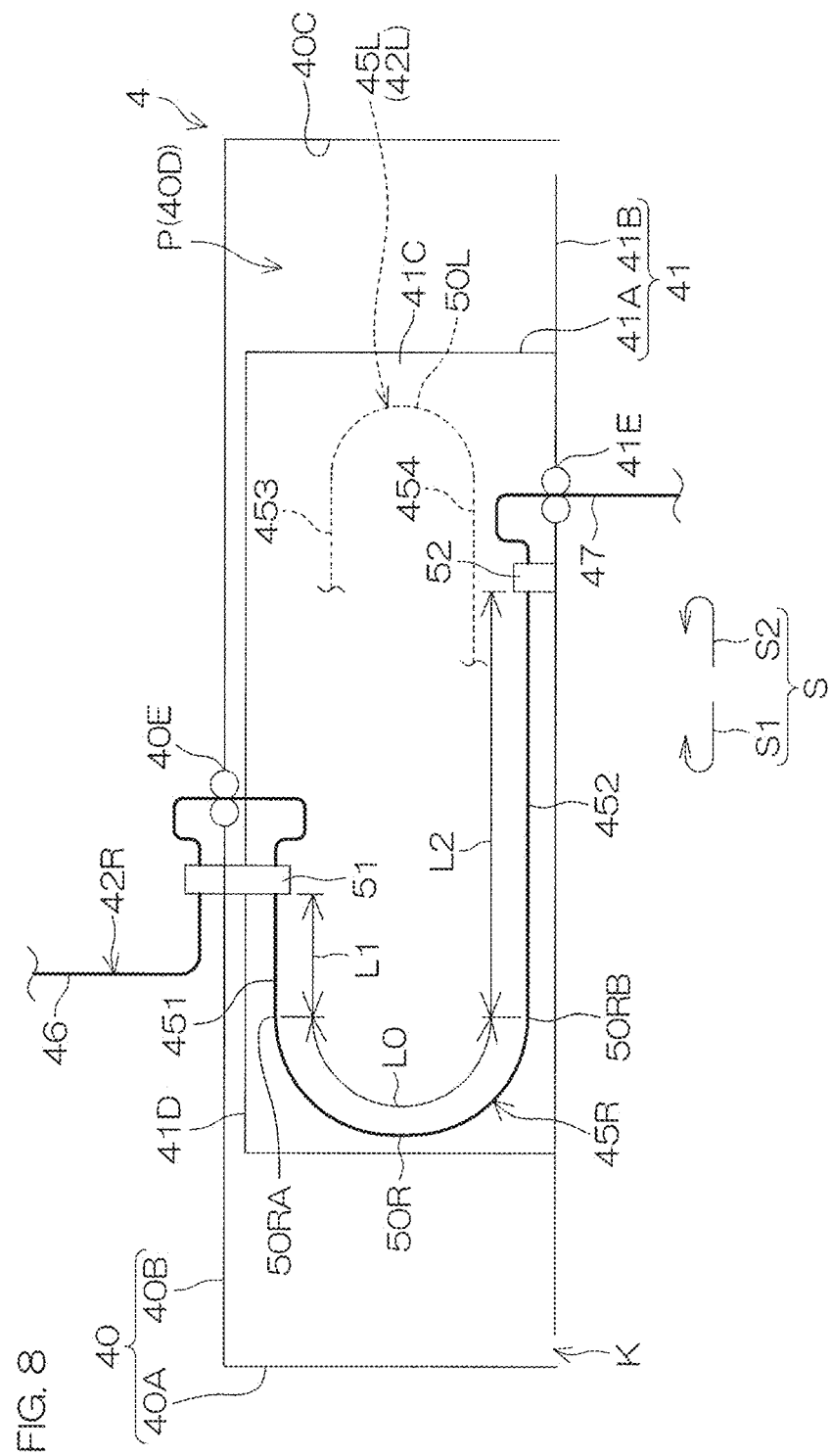
FIG. 8 is a view showing the main portion of the steering device for vessels when the steering wheel rotates right.

When the vessel operator causes the steering wheel 15 to rotate right from the neutral position, the rotor 40 deviates in the first circumferential direction S1 with respect to the stator 41 as shown in FIG. 8. Accordingly, in the first intermediate portion 45R, the first extension 451 fixed to the rotor 40 relatively moves in the first circumferential direction S1 with respect to the second extension 452 fixed to the stator 41. At that time, a downstream portion in the first circumferential direction S1 of the first extension 451 curves gradually downwardly, and becomes the end portion 50RA of the first connector 50R, and the first connector 50R moves in the first circumferential direction S1, and the opposite end portion 50RB of the first connector 50R becomes the second extension 452. Thus, the first extension 451 is shortened, and the second extension 452 is lengthened. Therefore, the length L1 of the first extension 451 becomes shorter than the length L2 of the second extension 452. Even if the steering wheel 15 rotates right, the length L0 of the first connector 50R is unchanged, and the total of the length L0, the length L1, and the length L2 is also unchanged. When the first intermediate portion 45R is deformed in this way, the first extension 451, the second extension 452, and the first connector 50R are guided in the circumferential direction S and in the axial direction D by at least one of the first circular-arc surface 40C of the rotor 40 and the second circular-arc surface 41C of the stator 41. In the second intermediate portion 45L of the second harness 42L, the third extension 453 moves in the first circumferential direction S1 in accordance with the right rotation of the steering wheel 15. At that time, a downstream portion in the first circumferential direction S1 of the third extension 453 curves gradually downwardly, and becomes the end portion 50LA of the second connector 50L, and the second connector 50L moves in the first circumferential direction S1, and the opposite end portion 50LB of the second connector 50L becomes the fourth extension 454. Thus, the third extension 453 is shortened, and the fourth extension 454 is lengthened. Therefore, the length of the third extension 453 becomes shorter than the length of the fourth extension 454. Even if the steering wheel 15 rotates right, the length of the second connector 50L is unchanged, and the total length of the third extension 453, the fourth extension 454, and the second connector 50L is also unchanged. When the second intermediate portion 45L is deformed in this way, the third extension 453, the fourth extension 454, and the second connector 50L are guided in the circumferential direction S and in the axial direction D by at least one of the first circular-arc surface 40C of the rotor 40 and the second circular-arc surface 41C of the stator 41.

FIG. 8 shows a state in which the rotational angle of the steering wheel 15 has reached a maximum value θ when the steering wheel 15 rotates right from the neutral position. Even if the rotational angle of the steering wheel 15 reaches the maximum value θ, the first connector 50R of the first harness 42R and both the third extension 453 and the fourth extension 454 of the second harness 42L are disposed apart from each other in the circumferential direction S. Even if the rotational angle of the steering wheel 15 reaches the maximum value θ, the second connector 50L of the second harness 42L and both the first extension 451 and the second extension 452 of the first harness 42R are disposed apart from each other in the circumferential direction S. It suffices to dispose at least one portion of the first intermediate portion 45R and the second intermediate portion 45L away from each other in the circumferential direction S if there is no concern that the first intermediate portion 45R of the first harness 42R and the second intermediate portion 45L of the second harness 42L will be entangled with each other when the rotational angle of the steering wheel 15 reaches the maximum value θ.

When the vessel operator who has caused the steering wheel 15 to rotate right in this way, causes the steering wheel 15 to rotate left to the neutral position, each harness 42 is deformed in reverse order in comparison with a case in which the steering wheel 15 rotates right from the neutral position.

Figure 9:
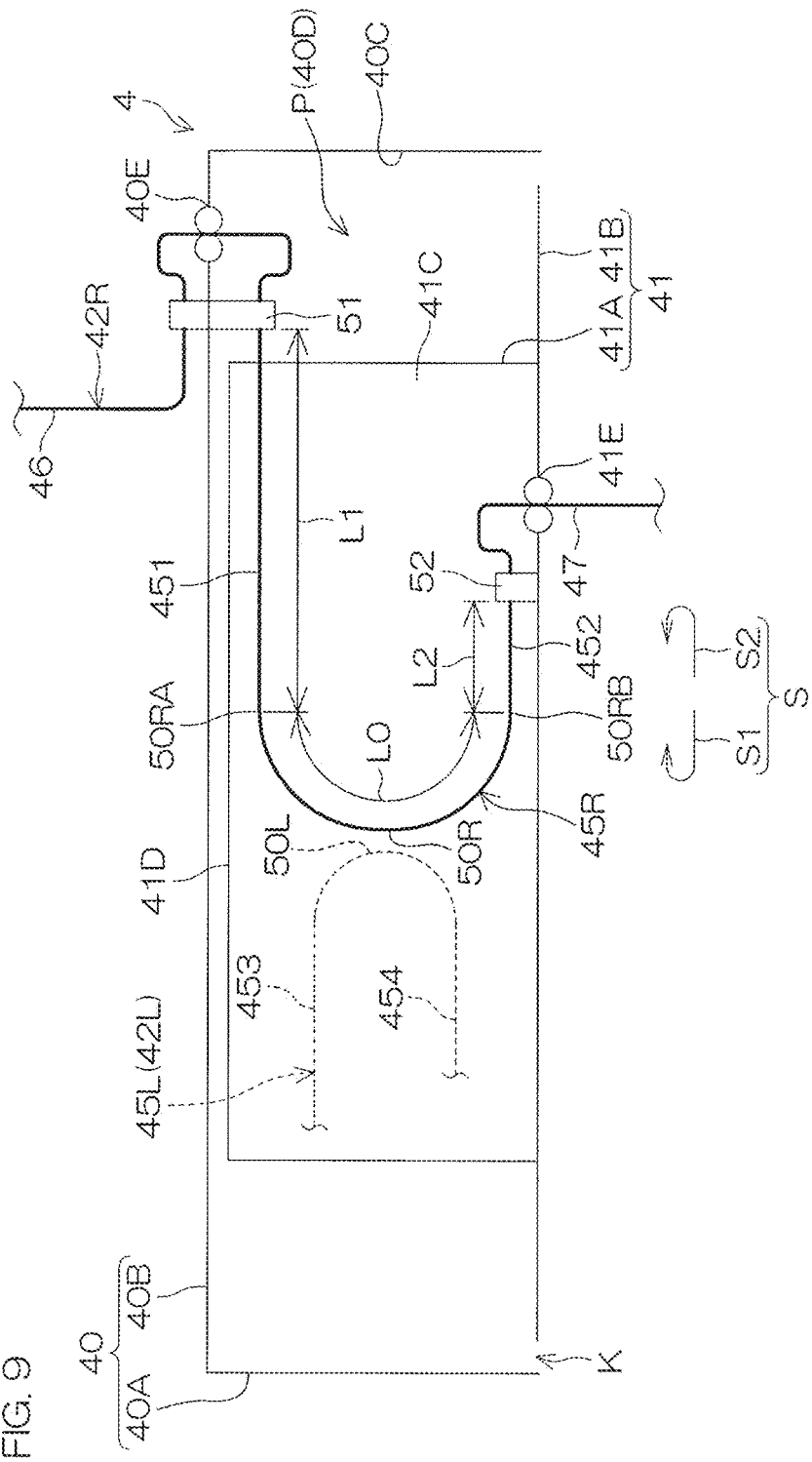
FIG. 9 is a view showing the main portion of the steering device for vessels when the steering wheel rotates left.

Thereafter, when the vessel operator causes the steering wheel 15 to rotate left from the neutral position, the rotor 40 deviates in the second circumferential direction S2 with respect to the stator 41 as shown in FIG. 9. Therefore, in the first intermediate portion 45R of the first harness 42R, the first extension 451 fixed to the rotor 40 relatively moves in the second circumferential direction S2 with respect to the second extension 452 fixed to the stator 41. At that time, a downstream portion in the first circumferential direction S1 of the second extension 452 curves gradually upwardly, and becomes the opposite end portion 50RB of the first connector 50R, and the first connector 50R moves in the second circumferential direction S2, and the end portion 50RA of the first connector 50R becomes the first extension 451. Thus, the second extension 452 is shortened, and the first extension 451 is lengthened. Therefore, the length L2 of the second extension 452 becomes shorter than the length L1 of the first extension 451. Even if the steering wheel 15 rotates left, the length L0 of the first connector 50R is unchanged, and the total of the length L0, the length L1, and the length L2 is also unchanged. When the first intermediate portion 45R is deformed in this way, the first extension 451, the second extension 452, and the first connector 50R are guided in the circumferential direction S and in the axial direction D by at least one of the first circular-arc surface 40C of the rotor 40 and the second circular-arc surface 41C of the stator 41.

In the second intermediate portion 45L of the second harness 42L, the third extension 453 moves in the second circumferential direction S2 in accordance with the left rotation of the steering wheel 15. At that time, a downstream portion in the first circumferential direction S1 of the fourth extension 454 curves gradually upwardly, and becomes the opposite end portion 50LB of the second connector 50L, and the second connector 50L moves in the second circumferential direction S2, and the end portion 50LA of the second connector 50L becomes the third extension 453. Thus, the fourth extension 454 is shortened, and the third extension 453 is lengthened. Therefore, the length of the fourth extension 454 becomes shorter than the length of the third extension 453. Even if the steering wheel 15 rotates left, the length of the second connector 50L is unchanged, and the total length of the third extension 453, the fourth extension 454, and the second connector 50L is also unchanged. When the second intermediate portion 45L is deformed in this way, the third extension 453, the fourth extension 454, and the second connector 50L are guided in the circumferential direction S and in the axial direction D by at least one of the first circular-arc surface 40C of the rotor 40 and the second circular-arc surface 41C of the stator 41.

FIG. 9 shows a state in which the rotational angle of the steering wheel 15 has reached a maximum value θ when the steering wheel 15 rotates left from the neutral position. Even if the rotational angle of the steering wheel 15 reaches the maximum value θ, the first connector 50R of the first harness 42R and both the third extension 453 and the fourth extension 454 of the second harness 42L are disposed apart from each other in the circumferential direction S. Even if the rotational angle of the steering wheel 15 reaches the maximum value θ, the second connector 50L of the second harness 42L and both the first extension 451 and the second extension 452 of the first harness 42R are disposed apart from each other in the circumferential direction S. It suffices to dispose at least one portion of the first intermediate portion 45R and the second intermediate portion 45L away from each other in the circumferential direction S if there is no concern that the first intermediate portion 45R of the first harness 42R and the second intermediate portion 45L of the second harness 42L will be entangled with each other when the rotational angle of the steering wheel 15 reaches the maximum value θ.

When the vessel operator who has caused the steering wheel 15 to rotate left in this way, causes the steering wheel 15 to rotate right to the neutral position, each harness 42 is deformed in reverse order in comparison with a case in which the steering wheel 15 rotates left from the neutral position.

As described above, in accordance with the rotation of the steering wheel 15, the total of the length L1 of the first extension 451, the length L2 of the second extension 452, and the length L0 of the first connector 50R does not change, and one of the first and second extensions 451 and 452 is lengthened, while the other one of the first and second extensions 451 and 452 is shortened. Likewise, in accordance with the rotation of the steering wheel 15, the total length of the third extension 453, the fourth extension 454, and the second connector 50L does not change, and one of the third and fourth extensions 453 and 454 is lengthened, while the other one of the third and fourth extensions 453 and 454 is shortened.

As described above, according to the present preferred embodiment, the first harness 42R connects together the first sensor 27R, which rotates around the rotational axis C together with both the steering wheel 15 and the right operator 16R, and the boat control unit 20, whose position in the circumferential direction S is stationary. The second harness 42L connects the second sensor 27L, which rotates around the rotational axis C together with both the steering wheel 15 and the left operator 16L, and the boat control unit 20 together. The first harness 42R is fixed to the rotor 40, which rotates together with the steering wheel 15, by the first fastener 51, and is fixed to the stator 41, whose position in the circumferential direction S is fixed, by the second fastener 52. The second harness 42L is fixed to the rotor 40 by the third fastener 53, and is fixed to the stator 41 by the fourth fastener 54.

In the first harness 42R, the shape of the first intermediate portion 45R between the first fastener 51 and the second fastener 52 changes in accordance with the relative movement in the circumferential direction S of the rotor 40 with respect to the stator 41 because the first harness 42R follows the rotation of the steering wheel 15 when the vessel operator rotates the steering wheel 15 in the circumferential direction S. Additionally, in the second harness 42L, the shape of the second intermediate portion 45L between the third fastener 53 and the fourth fastener 54 changes in accordance with the relative movement in the circumferential direction S of the rotor 40 with respect to the stator 41 because the second harness 42L follows the rotation of the steering wheel 15.

More specifically, the shape of the first intermediate portion 45R changes so that one of the first extension 451 and the second extension 452, each of which extends along the circumferential direction S in the first intermediate portion 45R, is lengthened and so that the other one of the first extension 451 and the second extension 452 is shortened. Additionally, the shape of the second intermediate portion 45L changes so that one of the third extension 453 and the fourth extension 454, each of which extends along the circumferential direction S in the second intermediate portion 45L, is lengthened and so that the other one of the third extension 453 and the fourth extension 454 is shortened. In this case, it is possible to cause the first harness 42R to follow the rotation of the steering wheel 15 by changing the ratio occupied by each of the first and second extensions 451 and 452 in the first intermediate portion 45R without stretching or shrinking the first intermediate portion 45R by using a helical portion described in Japanese Patent Application Publication No. 9-148028. Likewise, it is possible to cause the second harness 42L to follow the rotation of the steering wheel 15 by changing the ratio occupied by each of the third and fourth extensions 453 and 454 in the second intermediate portion 45L without stretching or shrinking the second intermediate portion 45L by using a helical portion.

Therefore, there is no need to provide a helical portion that is bulky and that is easily caught at the first intermediate portion 45R of the first harness 42R and at the second intermediate portion 45L of the second harness 42L. Therefore, it is possible to downsize the housing space for both the first harness 42R and the second harness 42L in the steering device 4 and also prevent the first harness 42R and the second harness 42L from being caught.

In a preferred embodiment of the present invention, the connector 50 is preferably U-shaped or substantially U-shaped. According to this structural arrangement, in the intermediate portion 45 of the harness 42, it is possible to arrange the intermediate portion 45 so that a pointed portion that is easily caught on the rotor 40 or on the stator 41 is absent at the connector 50 that connects the first extension 451 and the second extension 452 together. This makes it possible to further prevent the harness 42 from being caught.

In a preferred embodiment of the present invention, in the first harness 42R, the total of the length L1 of the first extension 451, the length L2 of the second extension 452, and the length L0 of the first connector 50R does not change in accordance with the rotation of the steering wheel 15. In this state, one of the first and second extensions 451 and 452 is lengthened, while the other one of the first and second extensions 451 and 452 is shortened.

According to this structural arrangement, it is possible to cause the first harness 42R to follow the rotation of the steering wheel 15 by changing the ratio occupied by each of the first and second extensions 451 and 452 in the intermediate portion 45 without stretching or shrinking the intermediate portion 45. The same applies to the second harness 42L. Therefore, there is no need to provide a helical portion, which is bulky and which is easily caught, at the intermediate portion 45 in order to stretch or shrink the intermediate portion 45. Therefore, it is possible to downsize the housing space for the harness 42 in the steering device 4 and also prevent the harness 42 from being caught.

In a preferred embodiment of the present invention, the connector 50 moves in the circumferential direction S in accordance with the rotation of the steering wheel 15. According to this structural arrangement, the first connector 50R moves in the circumferential direction S, and, as a result, the shape of the intermediate portion 45 smoothly changes so that one of the first and second extensions 451 and 452 is lengthened and so that the other one of the first and second extensions 451 and 452 is shortened. Likewise, the second connector 50L moves in the circumferential direction S, and, as a result, the shape of the intermediate portion 45 smoothly changes so that one of the third and fourth extensions 453 and 454 is lengthened and so that the other one of the third and fourth extensions 453 and 454 is shortened. Therefore, it is possible to prevent the intermediate portion 45, which is being deformed, from being caught on the rotor 40 or on the stator 41.

In a preferred embodiment of the present invention, the length L0 of the first connector 50R of the first harness 42R is unchanged even if the steering wheel 15 rotates. According to this structural arrangement, it is possible to cause the harness 42 to follow the rotation of the steering wheel 15 by changing the ratio occupied by each of the first and second extensions 451 and 452 in the intermediate portion 45 without stretching or shrinking the connector 50 by using a helical portion. The same applies to the second harness 42L. Therefore, there is no need to provide a helical portion, which is bulky and which is easily caught, at the intermediate portion 45. Therefore, it is possible to downsize the housing space for the harness 42 in the steering device 4 and also prevent the harness 42 from being caught.

In a preferred embodiment of the present invention, at least one of the rotor 40 and the stator 41 guides the first extension 451, the second extension 452, and the first connector 50R of the first harness 42R in the circumferential direction S and in the axial direction D. According to this structural arrangement, the shape of the intermediate portion 45 smoothly changes so as to change the ratio occupied by each of the first and second extensions 451 and 452 in the intermediate portion 45 by being guided by at least one of the rotor 40 and the stator 41 when the steering wheel 15 rotates. Therefore, it is possible to prevent the intermediate portion 45, which is being deformed, from being caught on the rotor 40 or on the stator 41. The same applies to the second harness 42L.

In a preferred embodiment of the present invention, when the steering wheel 15 is in the neutral position in the circumferential direction S in order for the jet propulsion watercraft 100 to travel straight, the length L1 of the first extension 451 and the length L2 of the second extension 452 are equal or substantially equal to each other in the first harness 42R. At this time, the length of the third extension 453 and the length of the fourth extension 454 are equal or substantially equal to each other in the second harness 42L.

According to this structural arrangement, when the vessel operator rotates the steering wheel 15 from the neutral position in the first circumferential direction S1, one of the first and second extensions 451 and 452 in the intermediate portion 45 is lengthened, and the other one of the first and second extensions 451 and 452 is shortened in the first harness 42R. In the second harness 42L, one of the third and fourth extensions 453 and 454 is lengthened, and the other one of the third and fourth extensions 453 and 454 is shortened. When the vessel operator rotates the steering wheel 15 from the neutral position in the second circumferential direction S2, one of the first and second extensions 451 and 452 is shortened, and the other one of the first and second extensions 451 and 452 is lengthened. Additionally, one of the third and fourth extensions 453 and 454 is shortened, and the other one of the third and fourth extensions 453 and 454 is lengthened. When the steering wheel 15 rotates from the neutral position to the maximum rotational angle in each of the first circumferential direction S1 and the second circumferential direction S2, the length of the first extension 451, the length of the second extension 452, the length of the third extension 453, and the length of the fourth extension 454 are in an unchanged state.

When the steering wheel 15 is in the neutral position, the length L1 of the first extension 451 and the length L2 of the second extension 452 are equal or substantially equal to each other, and the length of the third extension 453 and the length of the fourth extension 454 are equal or substantially equal to each other. Therefore, the maximum rotational angle of the steering wheel 15 when the steering wheel 15 rotates from the neutral position in the first circumferential direction S1 and the maximum rotational angle of the steering wheel 15 when the steering wheel 15 rotates from the neutral position in the second circumferential direction S2 become the same value or substantially the same value (the maximum value θ). Therefore, it is possible to downsize the housing space for the harness 42 in the steering device 4 and also prevent the harness 42 from being caught without providing an uncomfortable feeling to the vessel operator even if the vessel operator rotates the steering wheel 15 from the neutral position in the first circumferential direction S1 or in the second circumferential direction S2.

In a preferred embodiment of the present invention, at least one of the rotor 40 and the stator 41 defines the cylindrical containing space P that houses the intermediate portion 45. This structural arrangement enables the first and second extensions 451 and 452, each of which extends along the circumferential direction S, in the intermediate portion 45 to be disposed along the cylindrical shape of the containing space P. Thus, the intermediate portion 45 smoothly deforms along the cylindrical shape of the containing space P when the shape of the intermediate portion 45 changes so that one of the first and second extensions 451 and 452 is lengthened, and the other one of the first and second extensions 451 and 452 is shortened in accordance with the rotation of the steering wheel 15. Therefore, it is possible to prevent the intermediate portion 45 from being caught on the rotor 40 or on the stator 41. The same applies to the second harness 42L.

In a preferred embodiment of the present invention, the rotor 40 includes the first circular-arc surface 40C extending in the circumferential direction S. The stator 41 includes the second circular-arc surface 41C that extends in the circumferential direction S and that defines the containing space P between the first circular-arc surface 40C and the second circular-arc surface 41C.

This structural arrangement enables the first and second extensions 451 and 452, each of which extends along the circumferential direction S, in the intermediate portion 45 to be disposed along the first circular-arc surface 40C and the second circular-arc surface 41C each of which defines the containing space P. Thus, the intermediate portion 45 smoothly deforms along the first circular-arc surface 40C and the second circular-arc surface 41C when the shape of the intermediate portion 45 changes so that one of the first and second extensions 451 and 452 is lengthened, and the other one of the first and second extensions 451 and 452 is shortened in accordance with the rotation of the steering wheel 15. Therefore, it is possible to prevent the intermediate portion 45 from being caught on the rotor 40 or on the stator 41. The same applies to the second harness 42L.

In a preferred embodiment of the present invention, the first harness 42R additionally includes the first drawn portion 46 and the second drawn portion 47. The first drawn portion 46 is drawn out to the outside of the containing space P from the first end portion 45RA close to the first fastener 51 in the intermediate portion 45, and is connected to the sensor 27. The second drawn portion 47 is drawn out to the outside of the containing space P from the second end portion 45RB close to the second fastener 52 in the intermediate portion 45, and is connected to the boat control unit 20. According to this structural arrangement, while providing, with the first and second drawn portions 46 and 47, an electric connection between the sensor 27 and the boat control unit 20 with the harness 42, it is possible to downsize the housing space for the harness 42 in the steering device 4 and also prevent the harness 42 from being caught. The same applies to the second harness 42L.

In a preferred embodiment of the present invention, the containing space P that houses the intermediate portion 45 of the harness 42 is defined between the cylindrical first peripheral wall 40A in the rotor 40 and the second peripheral wall 41A disposed in the internal space 40D of the rotor 40 in the stator 41. The first fastener 51 and the third fastener 53 are disposed at the lower surface facing the containing space P in the ceiling wall 40B of the rotor 40, and the second fastener 52 and the fourth fastener 54 are disposed at the upper surface facing the containing space P in the bottom wall 41B of the stator 41. Thus, the intermediate portion 45 between the first fastener 51 and the second fastener 52 in the first harness 42R is isolated from members disposed around the rotor 40 by being housed in the containing space P. Additionally, the intermediate portion 45 between the third fastener 53 and the fourth fastener 54 in the second harness 42L is isolated from members disposed around the rotor 40 by being housed in the containing space P. Therefore, it is possible to prevent the intermediate portion 45 from being caught on members disposed around the rotor 40 when the steering wheel 15 rotates.

In a preferred embodiment of the present invention, in the first harness 42R, it is possible to connect the first drawn portion 46 to the sensor 27 by drawing the first drawn portion 46 out from the containing space P through the first through-hole 40E of the ceiling wall 40B. Additionally, it is possible to connect the second drawn portion 47 to the boat control unit 20 by drawing the second drawn portion 47 out from the containing space P through the second through-hole 41E of the bottom wall 41B. Therefore, while providing, with the first and second drawn portions 46 and 47, an electric connection between the sensor 27 and the boat control unit 20, it is possible to downsize the housing space for the harness 42 in the steering device 4 and also prevent the harness 42 from being caught. The same applies to the second harness 42L.

In a preferred embodiment of the present invention, in the first harness 42R, the space between the first through-hole 40E and the first drawn portion 46 is closed by the first seal 61, and the space between the second through-hole 41E and the second drawn portion 47 is closed by the second seal 62. Thus, while preventing water from flowing from the first through-hole 40E or from the second through-hole 41E into the containing space P, it is possible to downsize the housing space for the harness 42 in the steering device 4 and also prevent the harness 42 from being caught. The same applies to the second harness 42L.

In a preferred embodiment of the present invention, the gap K is provided between the first peripheral wall 40A and the bottom wall 41B. According to this structural arrangement, when water flows into the containing space P, it is possible to drain the water in the containing space P via the gap K between the first peripheral wall 40A and the bottom wall 41B. Therefore, while draining water from the containing space P into which the water has flowed, it is possible to downsize the housing space for the harness 42 in the steering device 4 and also prevent the harness 42 from being caught.

In a preferred embodiment of the present invention, the steering device 4 additionally includes another fastener 55 that fixes the first drawn portion 46 to the rotor 40 at a position different from the position of the first fastener 51 and another fastener 57 that fixes the third drawn portion 48 to the rotor 40 at a position different from the position of the third fastener 53. According to this structural arrangement, in the first drawn portion 46, a portion between the first fastener 51 and the other fastener 55 is not easily deformed when the steering wheel 15 rotates. Additionally, in the third drawn portion 48, a portion between the third fastener 53 and the other fastener 57 is not easily deformed when the steering wheel 15 rotates. This makes it possible to reduce a deformed portion in the first drawn portion 46 and in the third drawn portion 48 when the steering wheel 15 rotates, and therefore it is possible to prevent the first and third drawn portions 46 and 48 from being deformed and being caught on members disposed around the first and third drawn portions 46 and 48.

In a preferred embodiment of the present invention, the harness 42 includes the plurality of covered electric wires 43 bundled together. According to this structural arrangement, even if the harness 42 includes the plurality of covered electric wires 43 bundled together, it is possible to downsize the housing space for the harness 42 in the steering device 4 and also prevent the harness 42 from being caught.

In a preferred embodiment of the present invention, the plurality of covered electric wires 43 bundled together are connected to the sensor 27 through the waterproof connector 56 or 58. According to this structural arrangement, while securing waterproof properties of the waterproof connector 56 or 58 at a connecting location between the plurality of covered electric wires 43 and the sensor 27, it is possible to downsize the housing space for the harness 42 in the steering device 4 and also prevent the harness 42 from being caught. Each of the waterproof connectors 56 and 58 may be a single connector by which the plurality of covered electric wires 43 are collectively held, or each of the waterproof connectors 56 and 58 may be provided for each individual covered electric wire 43.

In a preferred embodiment of the present invention, it is possible to downsize the housing space for the harness 42 by which the sensor 27, which detects the operation of the operator 16 rotating together with the steering wheel 15, and the boat control unit 20 are connected together, and it is possible to prevent the harness 42 from being caught.

In a preferred embodiment of the present invention, the first connector 50R and the second connector 50L extend in the same direction, which is the first circumferential direction S1 or the second circumferential direction S2 (in the present preferred embodiment, in the first circumferential direction S1). According to this structural arrangement, while deforming both the first intermediate portion 45R and the second intermediate portion 45L in the same way when the steering wheel 15 rotates, it is possible to downsize the housing space for the first and second harnesses 42R and 42L and also prevent these harnesses 42 from being caught on each other.

In a preferred embodiment of the present invention, the end portion 50RA and the opposite end portion 50RB of the first connector 50R are positioned downstream of the first and second extensions 451 and 452 in the first circumferential direction S1. The end portion 50LA and the opposite end portion 50LB of the second connector 50L are positioned downstream of the third and fourth extensions 453 and 454 in the first circumferential direction S1.

According to this structural arrangement, it is possible to arrange the first harness 42R so that a pointed portion that is easily caught on the rotor 40 or on the stator 41 is absent around a connecting location between each of the first and second extensions 451 and 452 and the first connector 50R. This makes it possible to smoothly connect the first connector 50R to the first extension 451 and to the second extension 452. Likewise, it is possible to arrange the second harness 42L so that a pointed portion is absent around a connecting location between the second connector 50L and each of the third and fourth extensions 453 and 454. This makes it possible to smoothly connect the second connector 50L to the third extension 453 and to the fourth extension 454. Therefore, it is possible to further prevent the first harness 42R and the second harness 42L from being caught.

In a preferred embodiment of the present invention, the first intermediate portion 45R and the second intermediate portion 45L are disposed apart from each other in the circumferential direction S. According to this structural arrangement, in the first and second intermediate portions 45R and 45L, it is possible to prevent the first harness 42R and the second harness 42L from being caught on each other.

In a preferred embodiment of the present invention, when the jet propulsion watercraft 100 on which the steering device 4 is mounted travels straight, the steering wheel 15 is placed at the neutral position in the circumferential direction S. Even if the rotational angle of the steering wheel 15 reaches the maximum value θ when the steering wheel 15 rotates from the neutral position, the first connector 50R and each of the third and fourth extensions 453 and 454 are disposed apart from each other in the circumferential direction S. Even if the rotational angle of the steering wheel 15 reaches the maximum value θ when the steering wheel 15 rotates from the neutral position, the second connector 50L and each of the first and second extensions 451 and 452 are disposed apart from each other in the circumferential direction S.

According to this structural arrangement, it is possible to prevent the first harness 42R and the second harness 42L from being caught on each other until the rotational angle of the steering wheel 15 reaches the maximum value θ after the steering wheel 15 rotates from the neutral position.

In a preferred embodiment of the present invention, when the steering wheel 15 rotates from the neutral position and when the rotational angle of the steering wheel 15 reaches the maximum value θ, at least one portion of the first intermediate portion 45R and the second intermediate portion 45L are disposed apart from each other in the circumferential direction S. According to this structural arrangement, in a state in which the rotational angle of the steering wheel 15 has reached the maximum value θ when the steering wheel 15 rotates from the neutral position, it is possible to reduce a mutually overlapped portion of the first and second intermediate portions 45R and 45L, and therefore it is possible to prevent the first harness 42R and the second harness 42L from being caught on each other.

In a preferred embodiment of the present invention, the right operator 16R and the left operator 16L define a left and right pair of paddle switches. According to this structural arrangement, in the steering device 4 including the left and right pair of paddle switches, it is possible to downsize the housing space for both the first harness 42R and the second harness 42L and also prevent the first harness 42R and the second harness 42L from being caught.

In a preferred embodiment of the present invention, the right operator 16R is operated by the vessel operator in order to generate a thrust that makes the jet propulsion watercraft 100 on which the steering device 4 is mounted travel forwardly. The left operator 16L is operated by the vessel operator in order to generate a thrust that makes the jet propulsion watercraft 100 travel in reverse. According to this structural arrangement, in the steering device 4 in which the left and right paddle switches are operated to generate a thrust that makes the jet propulsion watercraft 100 travel forward and in reverse, it is possible to downsize the housing space for each harness 42 and also prevent the harnesses 42 from being caught on each other.

In a preferred embodiment of the present invention, the first target component 20R to which the first harness 42R is connected and the second target component 20L to which the second harness 42LR is connected are the same boat control unit 20. According to this structural arrangement, the boat control unit 20 and the first sensor 27R are connected together by the first harness 42R, and the boat control unit 20 and the second sensor 27L are connected together by the second harness 42L. In this structural arrangement, it is possible to downsize the housing space for both the first harness 42R and the second harness 42L and also prevent the first harness 42R and the second harness 42L from being caught.

Although preferred embodiments of the present invention have been described above, the present invention is not restricted to the contents of these preferred embodiments and various modifications are possible within the scope of the present invention.

Preferred embodiments of the present invention may be applied to, for example, an outboard-motor watercraft 200 shown in FIG. 10. The outboard-motor watercraft 200 includes a hull 201, an outboard motor 202 attached to its stern, and a steering element 203 that turns the outboard motor 202 rightward and leftward with respect to the hull 201. The outboard-motor watercraft 200 additionally includes the above-described steering device 4 and the lever operation portion 5. The outboard motor 202 includes an engine 204, a propeller 205, and a shift mechanism 206. The driving force of the engine 204 is transmitted to the propeller 205, thus generating a thrust. These components define a propulsion device. A shift mechanism 206 is interposed in a power transmitting path from the engine 204 to the propeller 205, and switches the rotation direction of the propeller 205 between a normal rotation direction and a reverse rotation direction. Accordingly, the shift mechanism 206 is an element of a forward-reverse switching device that switches the direction of a thrust generated by the propeller 205 between a forward direction and a reverse direction.

Additionally, as described in the above preferred embodiments, the operation angle of the steering wheel 15 is detected by the operation angle sensor 26, and, based on an operation angle detected by the operation angle sensor 26, the steering control unit 22 controls the nozzle actuator 9. In other words, the connection between the steering wheel 15 and the steering element is electrical, i.e., is a steer-by-wire system. Of course, the present invention is applicable also to a vessel that includes a steering system in which the steering wheel 15 and the steering element are mechanically connected together by use of, for example, wires.

Additionally, as described in the above preferred embodiments, the right operator 16R is a forward operator, and the left operator 16L is a reverse operator. However, a correspondence relationship between the left-and-right operators and forward/reverse traveling is arbitrary, and therefore the left operator 16L may be used as a forward operator, and the right operator 16R may be used as the reverse operator.

Additionally, as described in the above preferred embodiments, the two harnesses 42 (the first harness 42R and the second harness 42L) are disposed to correspond to the two sensors 27 (the first sensor 27R and the second sensor 27L) in the steering device 4. However, without being limited to this, for example, only one sensor 27 may be provided, and, in accordance with this, a single harness 42 may be provided. Additionally, three or more harnesses 42 may be provided. Additionally, the number of covered electric wires 43 in the harness 42 can be arbitrarily changed. Additionally, an air bag, a horn switch, etc., may be used as an electrical component that rotates together with the steering wheel 15 in addition to the sensor 27.

Additionally, as described in the above preferred embodiments, the first circular-arc surface 40C of the rotor 40 has a circularly cylindrical shape by being provided in the whole area of the inner peripheral surface of the first peripheral wall 40A. Likewise, the second circular-arc surface 41C of the stator 41 has a circularly cylindrical shape by being provided in the whole area of the outer peripheral surface of the second peripheral wall 41A. The first circular-arc surface 40C may be provided only in a partial area that coincides with the range of movement of the harness 42 in the circumferential direction S in the inner peripheral surface of the first peripheral wall 40A. Likewise, the second circular-arc surface 41C may be provided only in a partial area that coincides with the range of movement of the harness 42 in the circumferential direction S in the outer peripheral surface of the second peripheral wall 41A.

Additionally, although the stator 41 is housed in the internal space 40D of the rotor 40 as described in the above preferred embodiments, a positional relationship between these components may be reversed so that the rotor 40 is housed in the stator 41.

Various features described above may be appropriately combined together.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steering device for a vessel, the steering device comprising:
a steering wheel rotatable around a rotational axis;
an electrical component that rotates together with the steering wheel around the rotational axis;
a rotor that rotates together with the steering wheel around the rotational axis;
a stator whose position in a circumferential direction around the rotational axis is stationary;
a harness by which a target component, whose position in the circumferential direction is stationary, and the electrical component are connected together;
a first fastener that fixes the harness to the rotor; and
a second fastener that fixes the harness to the stator; wherein
an intermediate portion of the harness extending between the first fastener and the second fastener includes:
a first extension and a second extension each of which extends in the circumferential direction; and
a connector that connects the first extension and the second extension together and curves from extending in a first circumferential direction of the circumferential direction to extending in a second circumferential direction of the circumferential direction opposite to the first circumferential direction such that the intermediate portion does not completely surround the rotational axis; and
one of the first extension and the second extension is lengthened while another one of the first extension and the second extension is shortened in accordance with rotation of the steering wheel.

2. The steering device for a vessel according to claim 1, wherein the connector is U-shaped or substantially U-shaped.

3. The steering device for a vessel according to claim 1, wherein the one of the first extension and the second extension is lengthened while the another one of the first extension and the second extension is shortened in accordance with the rotation of the steering wheel without changing a total of a length of the first extension, a length of the second extension, and a length of the connector.

4. The steering device for a vessel according to claim 3, wherein the connector moves in the circumferential direction in accordance with the rotation of the steering wheel.

5. The steering device for a vessel according to claim 4, wherein the length of the connector is unchanged even if the steering wheel rotates.

6. The steering device for a vessel according to claim 4, wherein at least one of the rotor and the stator guides the first extension, the second extension, and the connector in the circumferential direction.

7. The steering device for a vessel according to claim 6, wherein at least one of the rotor and the stator guides the first extension, the second extension, and the connector in a direction in which the rotational axis extends.

8. The steering device for a vessel according to claim 3, wherein the length of the first extension and the length of the second extension are equal or substantially equal to each other when the steering wheel is in a neutral position in the circumferential direction in which the steering device steers the vessel to travel straight.

9. The steering device for a vessel according to claim 1, wherein at least one of the rotor and the stator defines a containing space that houses the intermediate portion.

10. The steering device for a vessel according to claim 9, wherein the rotor includes a first circular-arc surface that extends in the circumferential direction; and
the stator includes a second circular-arc surface that extends in the circumferential direction and that defines the containing space between the first circular-arc surface and the second circular-arc surface.

11. The steering device for a vessel according to claim 10, wherein the harness further includes:
a first drawn portion that is drawn out from a first end portion of the intermediate portion to an outside of the containing space and is connected to the electrical component; and
a second drawn portion that is drawn out from a second end portion of the intermediate portion to the outside of the containing space and is connected to the target component.

12. The steering device for a vessel according to claim 11, wherein a direction in which the rotational axis extends includes an up-down direction component;
the rotor includes a cylindrical first peripheral wall that includes the first circular-arc surface and a ceiling wall that is joined to the first peripheral wall and defines an internal space;
the stator includes a second peripheral wall that includes the second circular-arc surface and is disposed in the internal space and defines the containing space in the internal space and a bottom wall that is joined to the second peripheral wall and that faces the containing space from below;
the first fastener is disposed at a lower surface of the ceiling wall; and
the second fastener is disposed at an upper surface of the bottom wall.

13. The steering device for a vessel according to claim 12, wherein the ceiling wall includes a first through-hole through which the first drawn portion passes; and
the bottom wall includes a second through-hole through which the second drawn portion passes.

14. The steering device for a vessel according to claim 13, further comprising:
a first seal that closes a space between the first through-hole and the first drawn portion; and
a second seal that closes a space between the second through-hole and the second drawn portion.

15. The steering device for a vessel according to claim 12, further comprising a gap between the first peripheral wall and the bottom wall.

16. The steering device for a vessel according to claim 11, further comprising another fastener that fixes the first drawn portion to the rotor at a position differing from a position of the first fastener.

17. The steering device for a vessel according to claim 1, wherein the harness includes a plurality of covered electric wires bundled together.

18. The steering device for a vessel according to claim 17, wherein the plurality of covered electric wires are connected to the electrical component through a waterproof connector.

19. The steering device for a vessel according to claim 1, further comprising an operator that rotates around the rotational axis together with the steering wheel; wherein
the electrical component includes a sensor that detects an operation of the operator.

20. A steering device for a vessel, the steering device comprising:

a steering wheel rotatable around a rotational axis;
a first operator and a second operator each of which rotates together with the steering wheel around the rotational axis;
a first electrical component that rotates together with the steering wheel around the rotational axis and that includes a first sensor that detects an operation of the first operator;
a second electrical component that rotates together with the steering wheel around the rotational axis and that includes a second sensor that detects an operation of the second operator;
a rotor that rotates together with the steering wheel around the rotational axis;
a stator whose position in a circumferential direction around the rotational axis is stationary;
a first harness by which a first target component, whose position in the circumferential direction is stationary, and the first sensor are connected together;
a second harness by which a second target component, whose position in the circumferential direction is stationary, and the second sensor are connected together;
a first fastener that fixes the first harness to the rotor;
a second fastener that fixes the first harness to the stator;
a third fastener that fixes the second harness to the rotor; and
a fourth fastener that fixes the second harness to the stator; wherein
a first intermediate portion between the first fastener and the second fastener in the first harness includes:
  a first extension and a second extension each of which extends in the circumferential direction; and
  a first connector that connects the first extension and the second extension together and curves from extending in a first circumferential direction of the circumferential direction to extending in a second circumferential direction of the circumferential direction opposite to the first circumferential direction;
a second intermediate portion between the third fastener and the fourth fastener in the second harness includes:
  a third extension and a fourth extension each of which extends in the circumferential direction; and
  a second connector that connects the third extension and the fourth extension together and curves from extending in a first circumferential direction of the circumferential direction to extending in a second circumferential direction of the circumferential direction opposite to the first circumferential direction; and
wherein one of the first extension and the second extension is lengthened while the other one of the first extension and the second extension is shortened in accordance with rotation of the steering wheel, and one of the third extension and the fourth extension is lengthened while the other one of the third extension and the fourth extension is shortened in accordance with the rotation of the steering wheel.

21. The steering device for a vessel according to claim 20, wherein each of the first connector and the second connector extends in the first circumferential direction or in the second circumferential direction.

22. The steering device for a vessel according to claim 21, wherein the first connector and the second connector extend in the first circumferential direction;
an end portion of the first connector is positioned downstream of the first extension and the second extension in the first circumferential direction; and
an end portion of the second connector is positioned downstream of the third extension and the fourth extension in the first circumferential direction.

23. The steering device for a vessel according to claim 20, wherein the first intermediate portion and the second intermediate portion are disposed apart from each other in the circumferential direction.

24. The steering device for a vessel according to claim 23, wherein the steering wheel is placed at a neutral position in the circumferential direction when the steering device steers the vessel to travel straight; and
even if a rotational angle of the steering wheel reaches a maximum value when the steering wheel rotates from the neutral position, the first connector and each of the third and fourth extensions are disposed apart from each other in the circumferential direction, and the second connector and each of the first and second extensions are disposed apart from each other in the circumferential direction.

25. The steering device for a vessel according to claim 24, wherein, when the steering wheel rotates from the neutral position and the rotational angle of the steering wheel reaches the maximum value, at least one portion of the first intermediate portion and the second intermediate portion are disposed apart from each other in the circumferential direction.

26. The steering device for a vessel according to claim 20, wherein the first operator and the second operator define a left and right pair of paddle switches.

27. The steering device for a vessel according to claim 26, wherein the first operator is operated by a vessel operator in order to generate a thrust that makes the vessel travel forward; and
the second operator is operated by the vessel operator in order to generate a thrust that makes the vessel travel in reverse.

28. The steering device for a vessel according to claim 20, wherein the first target component and the second target component are defined by a same component.

29. A vessel comprising:
the steering device according to claim 1.

* * * * *